United States Patent
Rathinasamy et al.

(10) Patent No.: US 11,822,451 B2
(45) Date of Patent: Nov. 21, 2023

(54) DIRECT-ATTACH CABLE DATA TRANSMISSION VISUAL INDICATOR SYSTEM

(71) Applicant: Dell Products L.P., Round Rock, TX (US)

(72) Inventors: Shree Rathinasamy, Round Rock, TX (US); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 17/218,525

(22) Filed: Mar. 31, 2021

(65) Prior Publication Data
US 2022/0318116 A1    Oct. 6, 2022

(51) Int. Cl.
| | | |
|---|---|---|
| G06F 15/173 | (2006.01) |
| G06F 11/32 | (2006.01) |
| G06F 13/40 | (2006.01) |
| G06F 11/30 | (2006.01) |
| H04L 43/0817 | (2022.01) |

(52) U.S. Cl.
CPC ........ G06F 11/325 (2013.01); G06F 11/3006 (2013.01); G06F 13/4027 (2013.01); H04L 43/0817 (2013.01)

(58) Field of Classification Search
None
See application file for complete search history.

(56) References Cited

U.S. PATENT DOCUMENTS

| | | | |
|---|---|---|---|
| 7,019,658 B1 | 3/2006 | Erickson et al. | |
| 8,769,171 B2* | 7/2014 | Aronson | G02B 6/4284 710/63 |
| 9,749,039 B1* | 8/2017 | Chen | H04B 10/073 |
| 9,778,293 B1* | 10/2017 | Klein | G01R 19/1659 |
| 9,893,476 B2* | 2/2018 | Jenkins | H01R 13/665 |
| 10,832,536 B2* | 11/2020 | Sainath | H04Q 1/06 |
| 2004/0146254 A1* | 7/2004 | Morrison | G02B 6/447 385/100 |
| 2008/0267620 A1* | 10/2008 | Cole | H04B 10/0775 398/17 |
| 2011/0210844 A1 | 9/2011 | Dey | |
| 2012/0154165 A1* | 6/2012 | Bower, III | G06F 15/161 340/687 |
| 2013/0017715 A1* | 1/2013 | Laarhoven | H01R 13/717 439/490 |
| 2014/0156879 A1* | 6/2014 | Wong | G06F 11/3055 710/19 |
| 2017/0075850 A1* | 3/2017 | Boecker | G06F 11/0745 |
| 2017/0085045 A1 | 3/2017 | Cymerman | |

(Continued)

*Primary Examiner* — Phuoc H Nguyen
(74) *Attorney, Agent, or Firm* — Joseph Mencher

(57) ABSTRACT

A direct-attach cable data transmission visual indicator system includes a networking device having a port. A direct-attach cable includes a direct-attach cable connector that is located on an end of the direct-attach cable and that couples the direct-attach cable to the port. A visual indicator device is included on the direct-attach cable connector and is configured to receive data transmission information from the networking device via the port and the direct-attach cable connector, with the data transmission information associated with the transmission of data via the port. The visual indicator device then provides a visual indication that is based on the data transmission information.

20 Claims, 23 Drawing Sheets

(56) References Cited

U.S. PATENT DOCUMENTS

| | | | |
|---|---|---|---|
| 2017/0140890 A1 | 5/2017 | Tsang et al. | |
| 2017/0158068 A1 | 6/2017 | Dowell | |
| 2017/0220444 A1* | 8/2017 | Montero | G06F 11/3041 |
| 2017/0357803 A1* | 12/2017 | Amarilio | G06F 1/26 |
| 2018/0003743 A1* | 1/2018 | Jenkins | G01R 19/1659 |
| 2018/0074273 A1* | 3/2018 | Wang | G02B 6/385 |
| 2018/0136399 A1 | 5/2018 | Bauco et al. | |
| 2019/0257873 A1 | 8/2019 | Sholtis et al. | |
| 2019/0331864 A1* | 10/2019 | Shenai | G02B 6/3895 |
| 2020/0173582 A1 | 6/2020 | Persson | |
| 2020/0177525 A1* | 6/2020 | Morris | H04L 41/0681 |
| 2020/0184784 A1* | 6/2020 | Sainath | G08B 5/22 |
| 2020/0343822 A1* | 10/2020 | Nagy | H02M 7/043 |
| 2021/0199894 A1 | 7/2021 | Marques et al. | |
| 2022/0003947 A1 | 1/2022 | Hynes et al. | |
| 2022/0224618 A1* | 7/2022 | Rathinasamy | G06F 11/3041 |

* cited by examiner

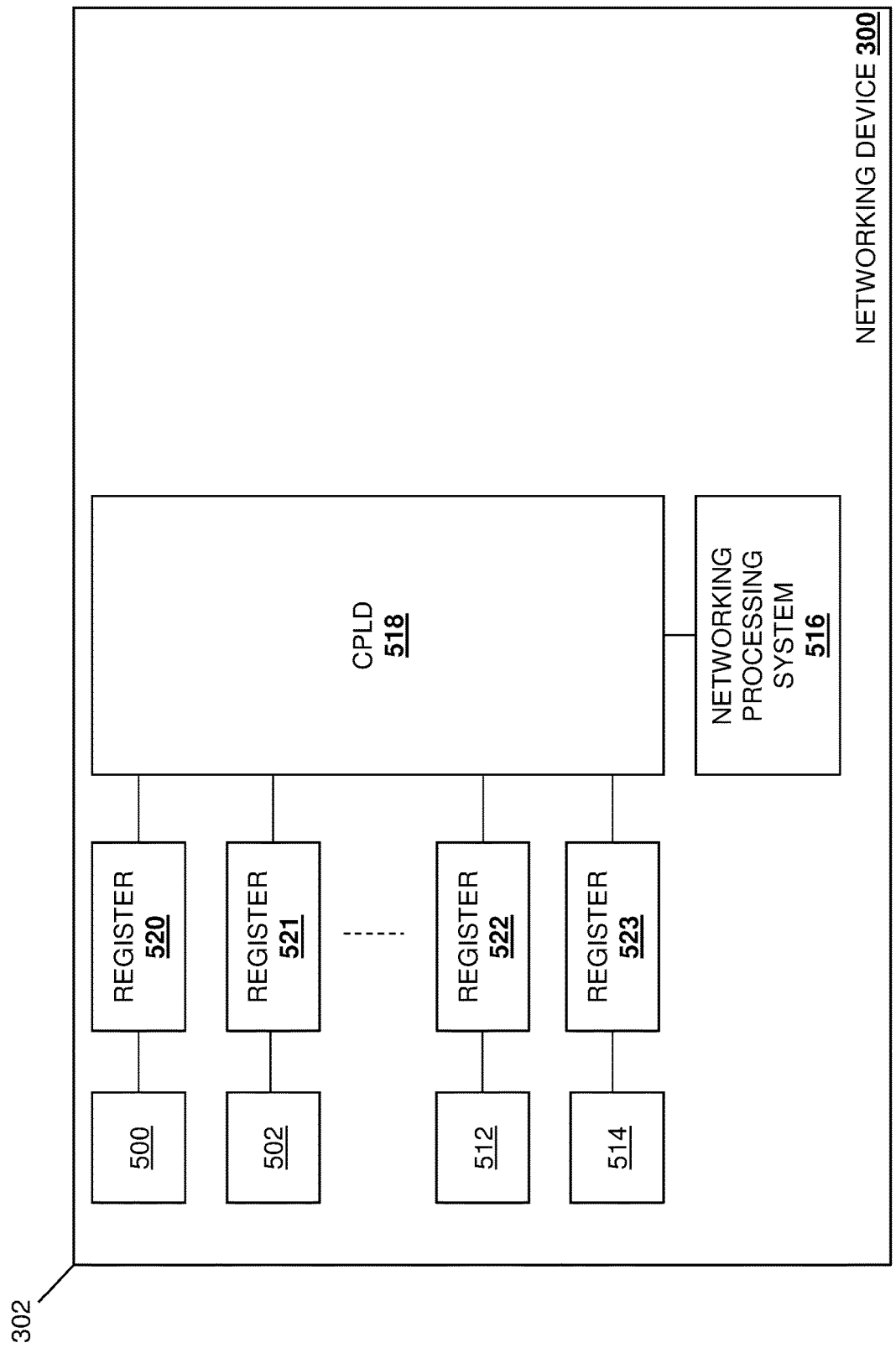

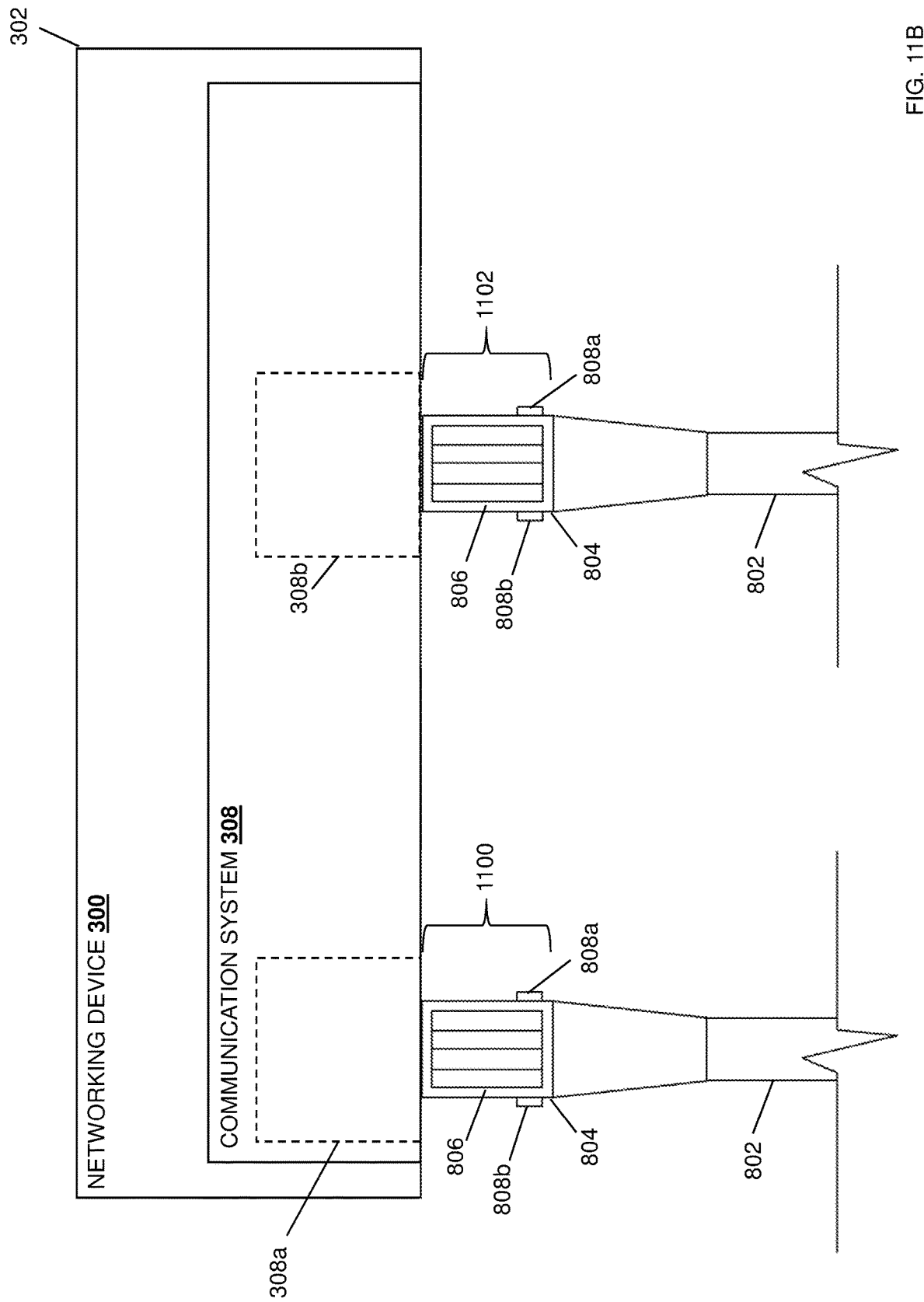

DIRECT-ATTACH CABLE DATA TRANSMISSION VISUAL INDICATOR SYSTEM

BACKGROUND

The present disclosure relates generally to information handling systems, and more particularly to providing visual indications of data transmission by information handling system via a direct-attach cable.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and other networking devices known in the art, are utilized to transmit data to connected devices. In many situations, it is desirable to provide visual indications of the data transmissions by switch devices, and conventionally switch devices have included one or more Light Emitting Devices (LEDs) adjacent each of their ports, with those LED(s) illuminating to provide visual indications of the data being transmitted via their adjacent port (e.g., visual indications of the characteristics of the link provided via that port, visual indications of characteristics of the data transmission speed, etc.). However, conventional switch devices may also allow direct-attach cables (e.g., passive Direct-Attach Copper (DAC) cables, active DAC cables, Active Optical Cables (AOCs), and/or other direct-attach cables known in the art) to be coupled the ports on the switch device via their direct-attach cable connectors. The connection of direct-attach cables to switch devices can raise issues with regard to the visual indication of data transmission by the switch device.

For example, conventionally, switch devices typically include a plurality of adjacent ports (e.g., the Z9100-ON switch platform available from the DELL® Inc. of Round Rock, Tex., United States includes a 100 GbE switch device with 32 ports, a 50 GbE switch device with 64 ports, a 40 GbE switch device with 32 ports, a 25 GbE switch deice with 128 ports, and a 10 GbE switch device with 128+2 ports that utilizes "breakout" cables.) In most situations, many (if not all) of the ports on the switch device will be connected to server devices, storage systems, and/or other equipment known in the art (e.g., in a rack) via the direct-attach cables discussed above that can obscure visual access to the LEDs adjacent the ports on the switch devices. While cable management techniques can be utilized to limit the obscuring of LEDs adjacent ports on the switch device, it is often the case that even cable management techniques are unable to address the obscuring of all the LEDs on the switch device, and in testing situations such cable management techniques are often not utilized. Furthermore, the direct-attach cable connectors on the direct-attach cables discussed above are provided with integrated release mechanisms that also operate to obstruct the view of the LEDs adjacent their connected port, and include cabling that is thicker than non-direct-attach cables and that operates to obscure the view of the LEDs adjacent the ports on the switch device as well. Finally, a current trend with switch devices is to remove the LEDs discussed above, which eliminates the ability to provide visual indications of the data transmission by the switch device.

Accordingly, it would be desirable to provide a direct-attach cable system that addresses the issues discussed above.

SUMMARY

According to one embodiment, a direct-attach cable includes a direct-attach cable connector that is located on an end of the direct-attach cable and that is configured to couple the direct-attach cable to a port on a networking device; and a visual indicator device that is included on the direct-attach cable connector and that is configured to: receive, from the networking device via the port and the direct-attach cable connector, data transmission information that is associated with the transmission of data via the port; and provide a visual indication that is based on the data transmission information.

BRIEF DESCRIPTION OF THE DRAWINGS

FIG. 5B is a schematic view illustrating an embodiment of the networking device of FIG. 5A.

FIG. 11B is a schematic view illustrating an embodiment of the direct-attach cable connector of FIGS. 8A-8C coupled to the networking device of FIG. 11A during the method of FIG. 9.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
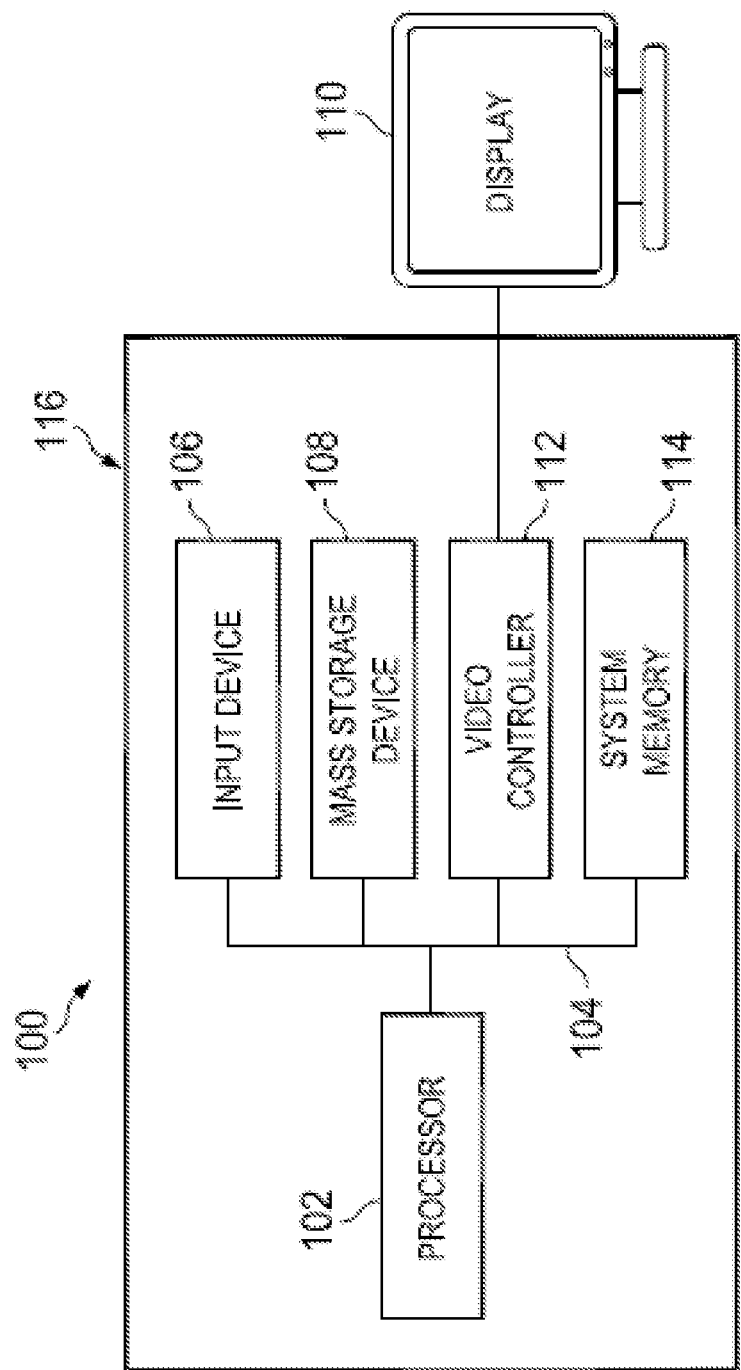
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
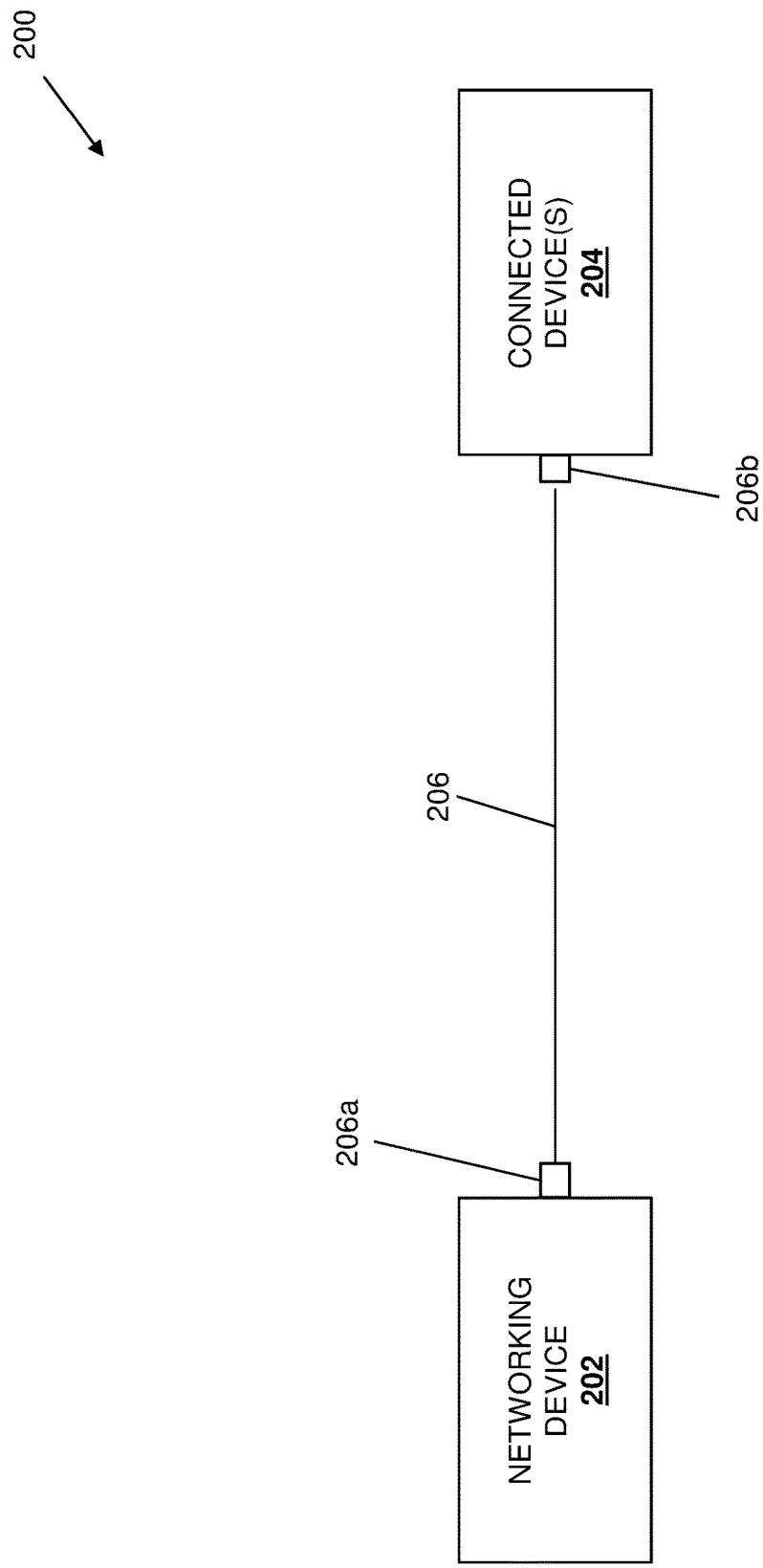
FIG. 2 is a schematic view illustrating an embodiment of a networked system that may utilize the direct-attach cable data transmission visual indicator system of the present disclosure.

Referring now to FIG. 2, an embodiment of a networked system 200 is illustrated. In the illustrated embodiment, the networked system 200 includes a networking device 202. In an embodiment, the networking device 202 may be provided by the IHS 100 discussed above with reference to FIG. 1, and/or may include some or all of the components of the IHS 100, and in the specific examples below is described as being provided by a switch device. However, while illustrated and discussed as being provided by a switch device, one of skill in the art in possession of the present disclosure will recognize that the networking device provided in the networked system 200 may include other computing devices that may be configured to operate similarly as the networking device 202 discussed below. As also illustrated in FIG. 2, a transceiver device 204 may be coupled to the networking device 202 via a port on the networking device 202, and may be provided by a variety of transceiver devices that would be apparent to one of skill in the art in possession of the present disclosure.

The networked system 200 also includes one or more connected devices 204. In an embodiment, the connected device(s) 204 may be provided by the IHS 100 discussed above with reference to FIG. 1, and/or may include some or all of the components of the IHS 100, and in the specific examples below are described as being provided by server devices. However, while illustrated and discussed as being provided by server devices, one of skill in the art in possession of the present disclosure will recognize that connected device(s) provided in the networked system 200 may include other computing devices (e.g., storage systems) that may be configured to operate similarly as the connected device(s) 204 discussed below.

In the illustrated embodiment, a direct-attach cable 206 couples the networking device 202 to the connected device(s) 204, and includes a direct-attach cable connector 206a that is connected to the networking device 202, and one or more direct-attach cable connectors 206b that are connected to the connected device(s) 204. For example, the direct-attach cable may be provided by a passive Direct-Attach Copper (DAC) cable (which may provide a direct connection between the direct-attach cable connectors 206a and 206b and may transmit data via copper wire), an active DAC cable (which may provide electronics within the direct-attach cable connectors 206a and 206b and may transmit data via copper wire), an Active Optical Cable (AOC) (which may provide electronics and optics within the direct-attach cable connectors 206a and 206b and may transmit data via optical fiber), and/or other direct-attach cables that would be apparent to one of skill in the art in possession of the present disclosure.

As discussed below, in some examples the direct-attach cable 206 may include a single direct-attach cable connector 206b that couples the networking device 202 to a single connected device 204, while in other examples the direct-attach cable 206 may be a "breakout cable" that includes a plurality of direct-attach cable connectors 206b that couple the networking device 202 to a plurality of connected devices 204 (e.g., four connected devices in the examples below), and one of skill in the art in possession of the present disclosure will appreciate how the teachings of the present disclosure may be applied to any of a variety of direct-attach cable configurations while remaining within the scope of the present disclosure as well. However, while a specific networked system 200 has been illustrated and described, one of skill in the art in possession of the present disclosure will recognize that the direct-attach cable data transmission visual indicator system of the present disclosure may include a variety of components and component configurations while remaining within the scope of the present disclosure as well.

Figure 3:
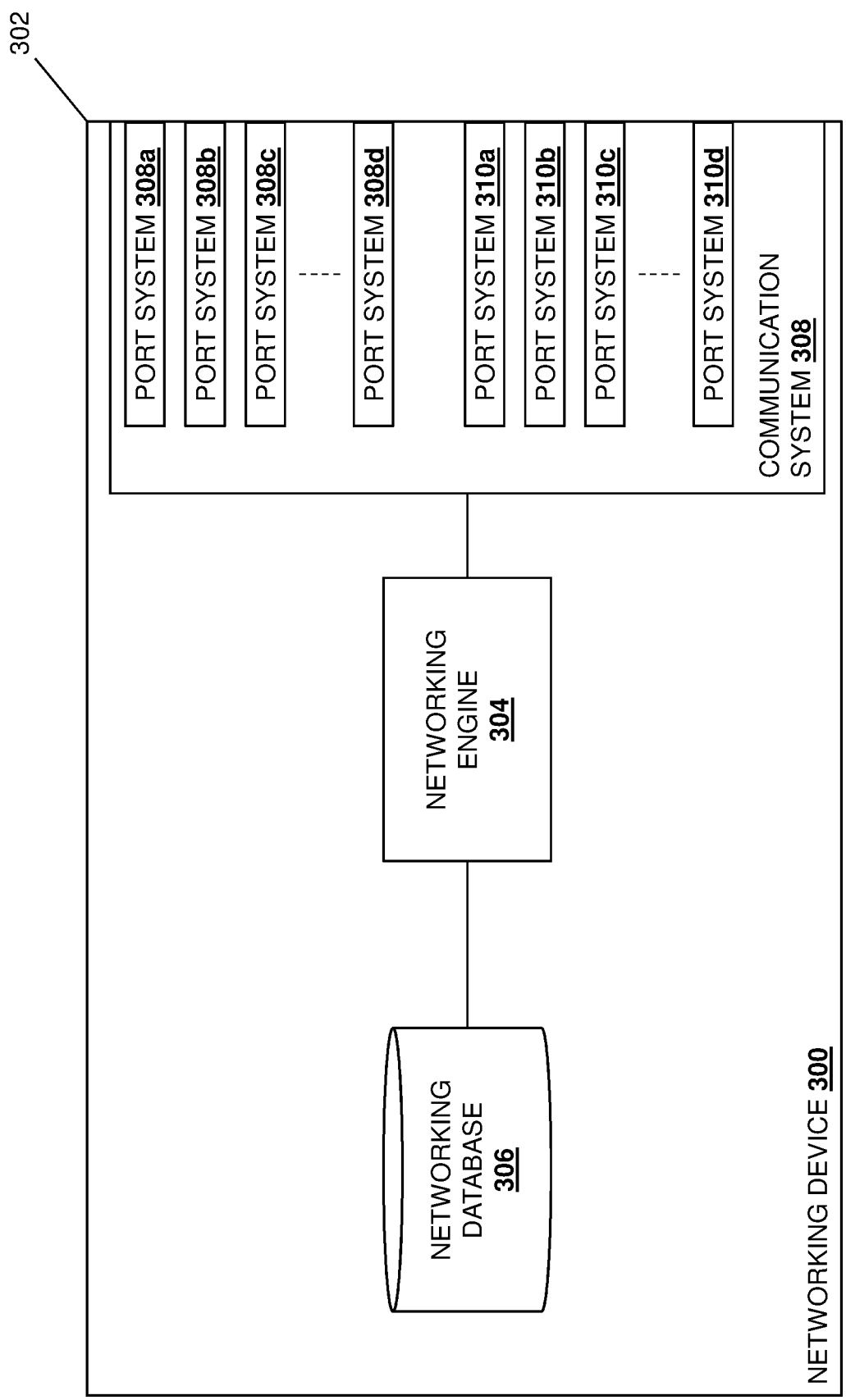
FIG. 3 is a schematic view illustrating an embodiment of a networking device that may be provided in the networked system of FIG. 2.

Referring now to FIG. 3, an embodiment of a networking device 300 is illustrated that may provide the networking device 202 discussed above with reference to FIG. 2. As such, the networking device 300 may be provided by the IHS 100 discussed above with reference to FIG. 1 and/or may include some or all of the components of the IHS 100, and in the specific examples below is described as a switch device. However, while illustrated and discussed as being provided by a switch device, one of skill in the art in possession of the present disclosure will recognize that the functionality of the networking device 300 discussed below may be provided by other computing devices that are configured to operate similarly as the networking device 300 discussed below. In the illustrated embodiment, the networking device 300 includes a chassis 302 that houses the components of the networking device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking engine 304 that is configured to perform the functionality of the networking engines and/or networking devices discussed below.

The chassis 302 may also house a storage system (not illustrated, but which may include the storage 108 discussed above with reference to FIG. 1) that is coupled to the networking engine 304 (e.g., via a coupling between the storage system and the processing system) and that includes a networking database 306 that is configured to store any of the information utilized by the networking engine 304 discussed below. The chassis 302 may also house a communication system 308 that is coupled to the networking engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the embodiment illustrated in FIG. 3, the communication system 308 includes a plurality of port systems 308a, 308b, 308c, and up to 308d, as well as a plurality of port systems 310a, 310b, 310c, and up to 310d, discussed in further detail below. However, while a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4A:
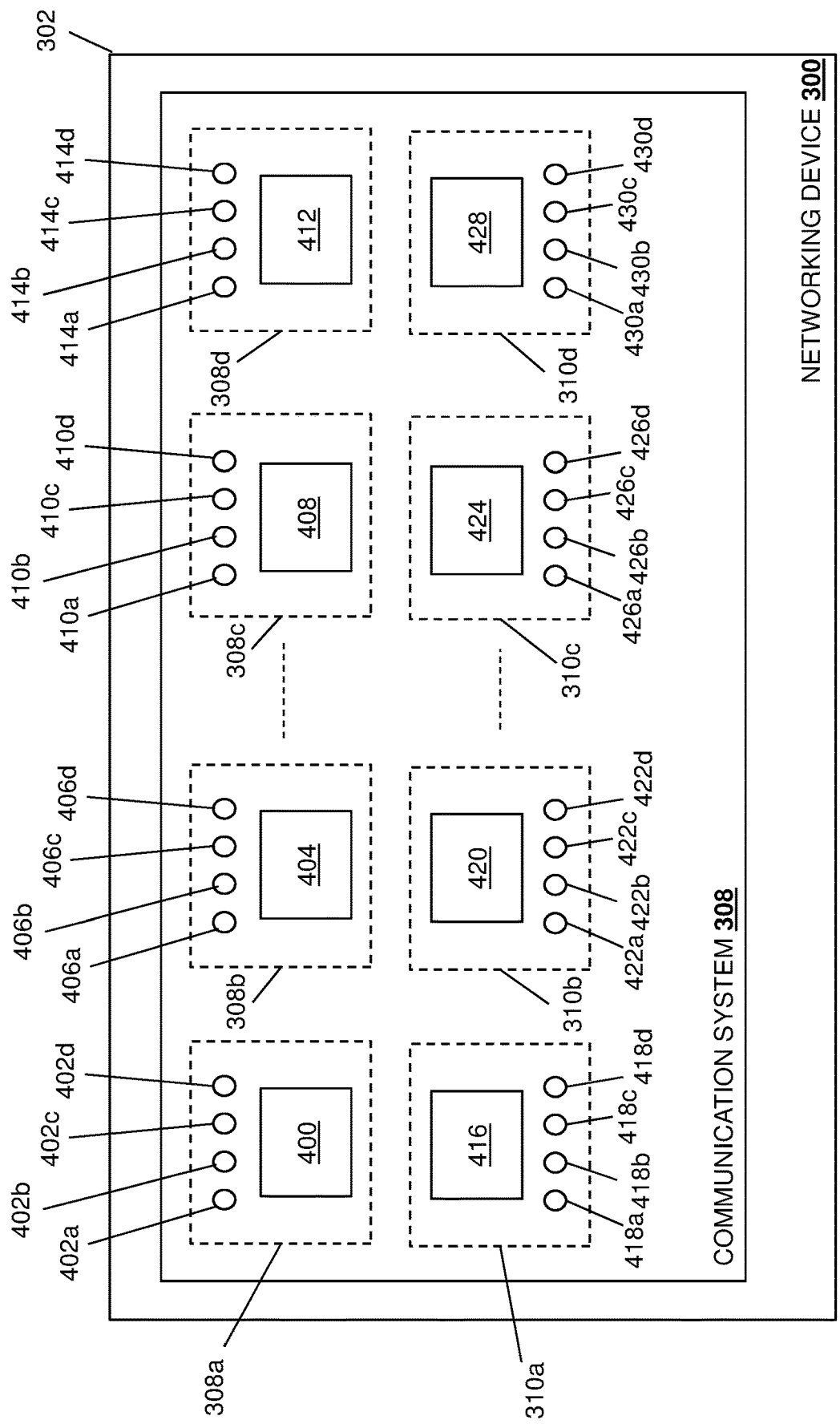
FIG. 4A is a schematic view illustrating an embodiment of the networking device of FIG. 3.
Figure 4B:
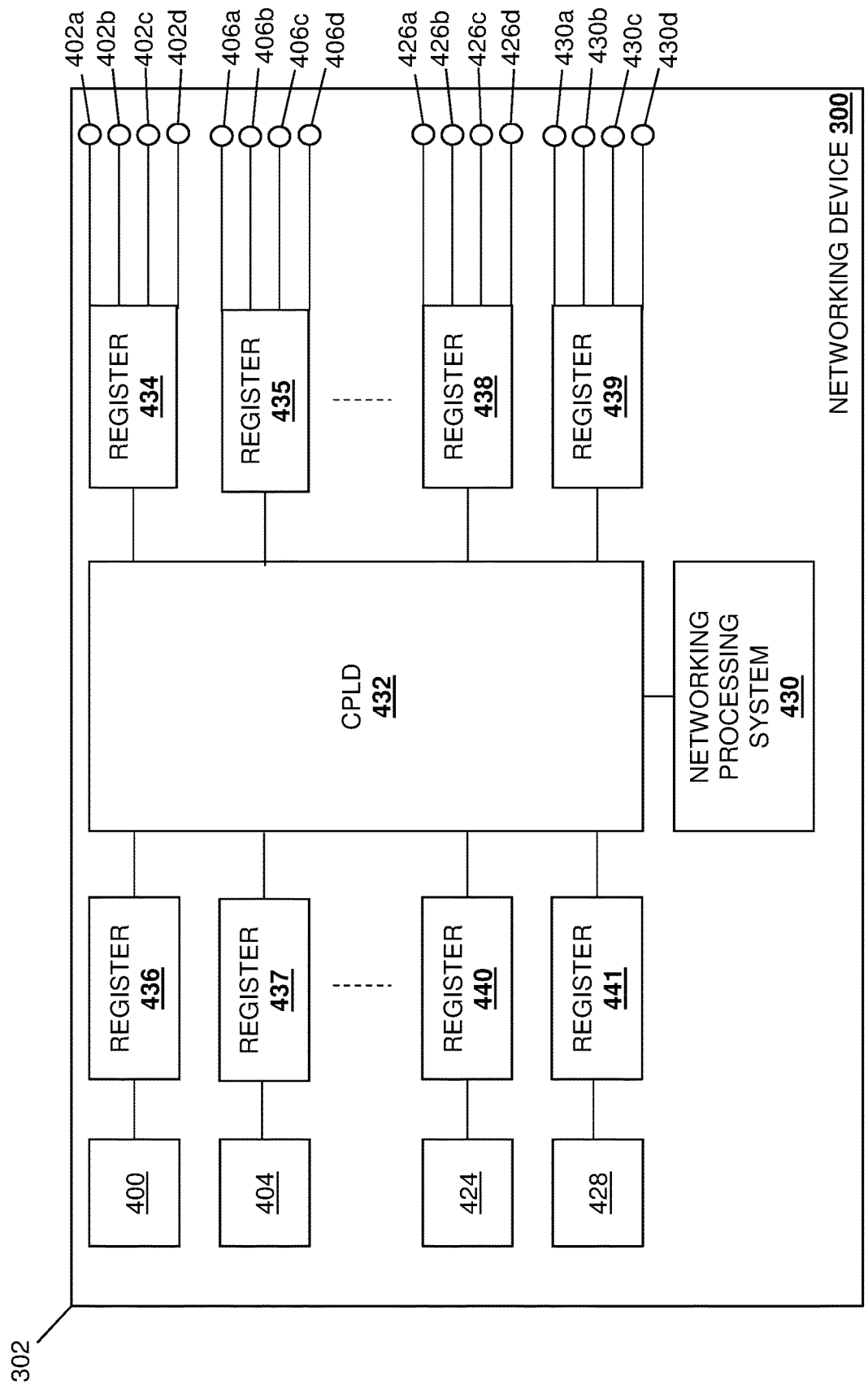
FIG. 4B is a schematic view illustrating an embodiment of the networking device of FIG. 4A.

Referring now to FIGS. 4A and 4B, a specific embodiment of the networking device 300 discussed above with reference to FIG. 3 is illustrated. In the embodiment illustrated in FIGS. 4A and 4B, the port systems 308a-308d and 310a-310d include visual indicator devices along with ports. For example, FIG. 4A illustrate the port system 308a including a port 400 and a visual indicator device that is located adjacent that port 400 and that includes LEDs 402a, 402b, 402c, and 402d; the port system 308b including a port 404 and a visual indicator device that is located adjacent that port 404 and that includes LEDs 406a, 406b, 406c, and 406d; the port system 308c including a port 408 and a visual indicator device that is located adjacent that port 408 and that includes LEDs 410a, 410b, 410c, and 410d; and the port system 308d including a port 412 and a visual indicator device that is located adjacent that port 412 and that includes LEDs 414a, 414b, 414c, and 414d; with the port systems 308a-308d provided in a first/upper row on the networking device 300. FIG. 4A also illustrates the port system 310a including a port 416 and a visual indicator device that is located adjacent that port 416 and that includes LEDs 418a, 418b, 418c, and 418d; the port system 310b including a port 420 and a visual indicator device that is located adjacent that port 420 and that includes LEDs 422a, 422b, 422c, and 422d; the port system 310c including a port 424 and a visual indicator device that is located adjacent that port 424 and that includes LEDs 426a, 426b, 426c, and 426d; and the port system 310d including a port 428 and a visual indicator device that is located adjacent that port 428 and that includes LEDs 430a, 430b, 430c, and 430d; with the port systems 310a-310d provided in a second/lower row on the networking device 300.

Furthermore, FIG. 4B illustrates how the networking device 300 may include a networking processing system 430 (e.g., a switch Application Specific Integrated Circuit (ASIC)) and a Complex Programmable Logic Device (CPLD) 432 that are coupled together, and that may provide a portion of the networking engine 304 and/or the communication system 308 discussed above with reference to FIG. 3. A register 434 (e.g., a serial-to-parallel shift register) is coupled to the CPLD 432 and to the LEDs 402a-402d that provide the visual indicator device for the port system 308a (e.g., via 8 pins on the register 434 coupled to the LEDs 402a-402d), and a register 435 (e.g., a serial-to-parallel shift register) is coupled to the CPLD 432 and to the LEDs 406a-406d that provide the visual indicator device for the port system 308b (e.g., via eight pins on the register 435 coupled to the LEDs 406a-406d). As will be recognized by one of skill in the art in possession of the present disclosure, the embodiment illustrated and described with reference to FIG. 4B provides an example a multi-color LED system in which each register 434 and 435 includes two of its pins coupled to each respective LED to enable that LED to illuminate green (via the assertion of the first pin), red (via the assertion of the second pin), and amber (via the assertion of both the first pin and the second pin). However, while a specific multi-color LED system is described, one of skill in the art in possession of the present disclosure will appreciate that other LED systems will fall within the scope of the present disclosure as well.

As will be appreciated by one of skill in the art in possession of the present disclosure, the networking processing system 430, the CPLD 432, and/or the register 434 may be configured to generate and transmit data transmission information associated with the transmission of data via the port 400 in the port system 308a to the LEDs 402a-402d that provide the visual indicator device for the port system 308a in order to allow those LEDs 402a-402d to provide visual indications associated with those data transmissions (e.g., visual indications of the characteristics of the link provided via that port, visual indications of characteristics of the data transmission speed, etc.), and thus may include any of a variety of conventional port LED components that would be apparent to one of skill in the art in possession of the present disclosure. As such, the data transmission information may be configured to indicate the status of a port/physical link between connected devices via the LEDs 402a-402d regardless of whether data is currently being transmitted between those connected devices (e.g., the LEDs 402a-402d may provide a "solid" illumination to indicate a port/physical link is "up" or available"), the status of port/data transmissions between connected devices via the LEDs 402a-402d when data is being transmitted between those connected devices (e.g., the LEDs 402a-402d may provide a "blinking" illumination to indicate data is being transmitted), and as well any other data transmission characteristics that would be apparent to one of skill in the art in possession of the present disclosure.

Similarly, the networking processing system 430, the CPLD 432, and/or the register 435 may be configured to generate and transmit data transmission information associated with the transmission of data via the port 404 in the port system 308b to the LEDs 406a-406d that provide the visual indicator device for the port system 308b in order to allow those LEDs 406a-406d to provide visual indications associated with those data transmissions (e.g., visual indications of the characteristics of the link provided via that port, visual indications of characteristics of the data transmission speed, etc.), and thus may include any of a variety of conventional port LED components that would be apparent to one of skill in the art in possession of the present disclosure. As such, the data transmission information may be configured to indicate the status of a port/physical link between connected devices via the LEDs 406a-406d regardless of whether data is currently being transmitted between those connected devices (e.g., the LEDs 406a-406d may provide a "solid" illumination to indicate a port/physical link is "up" or available"), the status of port/data transmissions between connected devices via the LEDs 406a-406d when data is being transmitted between those connected devices (e.g., the LEDs 406a-406d may provide a "blinking" illumination to indicate data is being transmitted), and as well any other data transmission characteristics that would be apparent to one of skill in the art in possession of the present disclosure.

In addition, a register 436 (e.g., a serial-to-parallel shift register) is coupled to the CPLD 432 and the port 400 in the port system 308a (e.g., via eight pins on the register 436 coupled to the port 400), and a register 437 (e.g., a serial-to-parallel shift register) is coupled to the CPLD 432 and the port 404 in the port system 308b (e.g., via eight pins on the register 437 coupled to the port 404). Similarly as discussed above, the embodiment illustrated in FIG. 4B provides an example a multi-color LED system in which each register 436 and 437 includes two of its pins that are configured to couple to respective LED(s) on a direct-attach cable connector to enable those LED(s) to illuminate green (via the assertion of the first pin), red (via the assertion of the second pin), and amber (via the assertion of both the first pin and the second pin). However, while a specific multi-color LED system is described, one of skill in the art in possession of the present disclosure will appreciate that other LED systems will fall within the scope of the present disclosure as well.

As discussed below, the networking processing system 430, the CPLD 432, and/or the register 436 may be configured to duplicate data transmission information that is associated with the transmission of data via the port 400 in the port system 308a and that is provided via the register 434 to the LEDs 402a-402d, and provide that data transmission information via the port 400 to a direct-attach cable connector that is coupled to the port 400, discussed in further detail below. Similarly, the networking processing system 430, the CPLD 432, and/or the register 437 may be configured to duplicate data transmission information that is associated with the transmission of data via the port 404 in the port system 308b and that is provided via the register 435 to the LEDs 406a-406d, and provide that data transmission information via the port 404 to a direct-attach cable connector that is coupled to the port 404, discussed in further detail below.

As will be appreciated by one of skill in the art in possession of the present disclosure, a respective pair of registers that are similar to the registers 434/436 and 435/437 may be provided for each port system on the networking device 300. As such, FIG. 4B illustrates a register 438 (e.g., a serial-to-parallel shift register) coupled to the CPLD 432 and to the LEDs 426a-426d that provide the visual indicator device for the port system 310c (e.g., via eight pins on the register 438 coupled to the LEDs 426a-426d), and a register 439 (e.g., a serial-to-parallel shift register) coupled to the CPLD 432 and to the LEDs 430a-430a that provide the visual indicator device for the port system 310d (e.g., via eight pins on the register 439 coupled to the LEDs 430a-430d). As will be appreciated by one of skill in the art in possession of the present disclosure, the networking processing system 430, the CPLD 432, and/or the register 438 may be configured to generate and transmit data transmission information associated with the transmission of data via the port 424 in the port system 310c to the LEDs 426a-426d that provide the visual indicator device for the port system 310c in order to allow those LEDs 426a-426d to provide visual indications associated with those data transmissions (e.g., visual indications of the characteristics of the link provided via that port, visual indications of characteristics of the data transmission speed, etc.), and thus may include any of a variety of conventional port LED components that would be apparent to one of skill in the art in possession of the present disclosure. As such, the data transmission information may be configured to indicate the status of a port/physical link between connected devices via the LEDs 426a-426d regardless of whether data is currently being transmitted between those connected devices (e.g., the LEDs 426a-426d may provide a "solid" illumination to indicate a port/physical link is "up" or available"), the status of port/data transmissions between connected devices via the LEDs 426a-426d when data is being transmitted between those connected devices (e.g., the LEDs 426a-426d may provide a "blinking" illumination to indicate data is being transmitted), and as well any other data transmission characteristics that would be apparent to one of skill in the art in possession of the present disclosure.

Similarly, the networking processing system 430, the CPLD 432, and/or the register 439 may be configured to generate and transmit data transmission information associated with the transmission of data via the port 428 in the port system 310d to the LEDs 430a-430d that provide the visual indicator device for the port system 310d in order to allow those LEDs 430a-430d to provide visual indications associated with those data transmissions (e.g., visual indications of the characteristics of the link provided via that port, visual indications of characteristics of the data transmission speed, etc.), and thus may include any of a variety of conventional port LED components that would be apparent to one of skill in the art in possession of the present disclosure. As such, the data transmission information may be configured to indicate the status of a port/physical link between connected devices via the LEDs 430a-430d regardless of whether data is currently being transmitted between those connected devices (e.g., the LEDs 430a-430d may provide a "solid" illumination to indicate a port/physical link is "up" or available"), the status of port/data transmissions between connected devices via the LEDs 430a-430d when data is being transmitted between those connected devices (e.g., the LEDs 430a-430d may provide a "blinking" illumination to indicate data is being transmitted), and as well any other data transmission characteristics that would be apparent to one of skill in the art in possession of the present disclosure.

In addition, a register 440 (e.g., a serial-to-parallel shift register) is coupled to the CPLD 432 and the port 424 in the port system 310c (e.g., via eight pins on the register 440 coupled to the port 424), and a register 441 (e.g., a serial-to-parallel shift register) is coupled to the CPLD 432 and the port 428 in the port system 310d (e.g., via eight pins on the register 440 coupled to the port 428). As discussed below, the networking processing system 430, the CPLD 432, and/or the register 440 may be configured to duplicate data transmission information that is associated with the transmission of data via the port 424 in the port system 310c and that is provided via the register 438 to the LEDs 426a-426d, and provide that data transmission information via the port 424 to a direct-attach cable connector that is coupled to the port 424, discussed in further detail below. Similarly, the networking processing system 430, the CPLD 432, and/or the register 441 may be configured to duplicate data transmission information that is associated with the transmission of data via the port 428 in the port system 310d and that is provided via the register 439 to the LEDs 430a-430d, and provide that data transmission information via the port 428 to a direct-attach cable connector that is coupled to the port 428, discussed in further detail below.

Figure 5A:
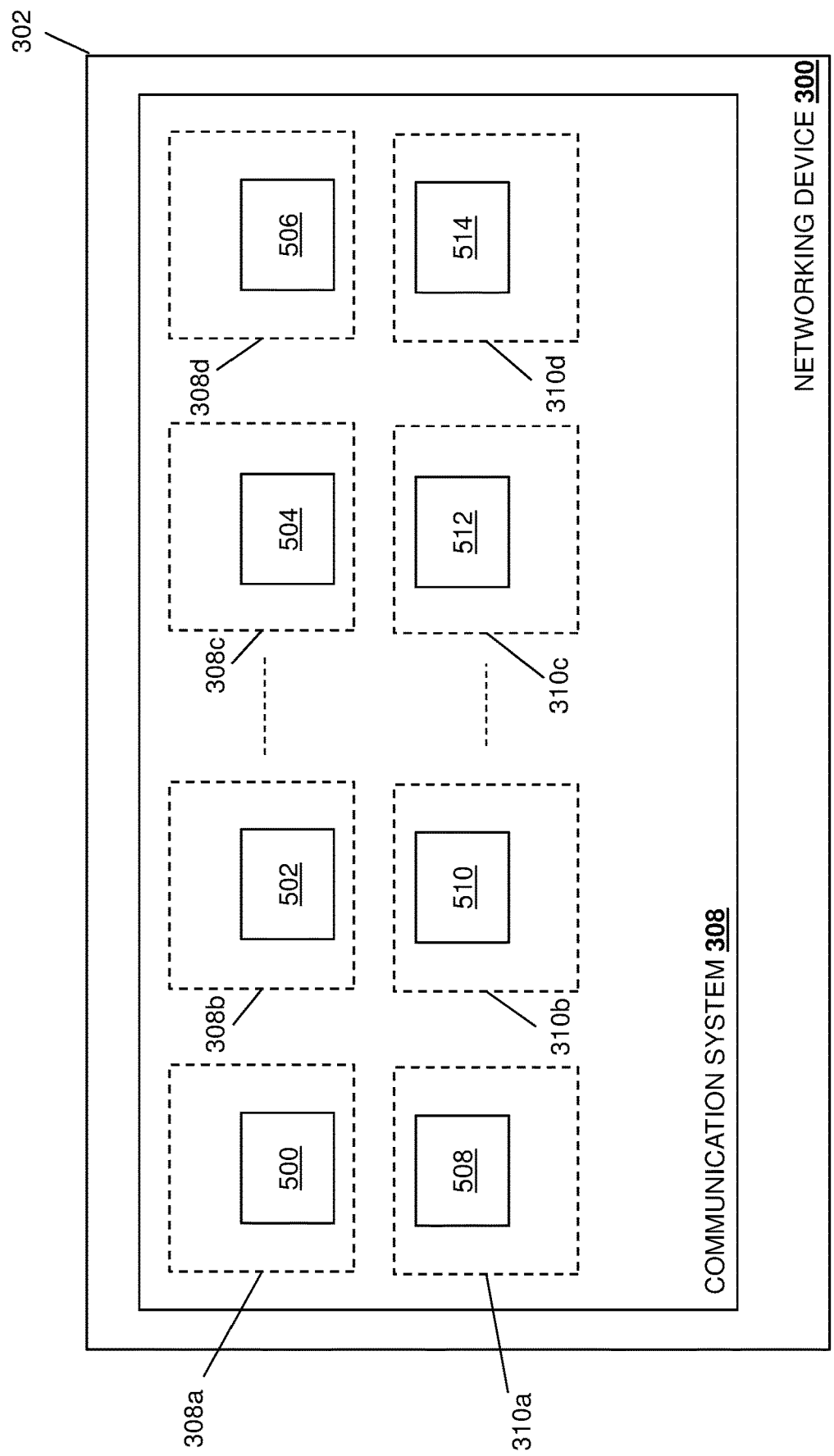
FIG. 5A is a schematic view illustrating an embodiment of the networking device of FIG. 3.

Referring now to FIGS. 5A and 5B, a specific embodiment of the networking device 300 discussed above with reference to FIG. 3 is illustrated. In the embodiment illustrated in FIGS. 5A and 5B, the port systems 308a-308d and 310a-310d include ports but no visual indicator devices. For example, FIG. 5A illustrate the port system 308a including a port 500, the port system 308b including a port 502, the port system 308c including a port 504, and the port system 308d including a port 506, with the port systems 308a-308d provided in a first/upper row on the networking device 300. FIG. 5A also illustrates the port system 310a including a port 508, the port system 310b including a port 510, the port system 310c including a port 512, and the port system 310d including a port 514, with the port systems 310a-310d provided in a second/lower row on the networking device 300.

Furthermore, FIG. 5B illustrates how the networking device 300 may include a networking processing system 516 (e.g., a switch Application Specific Integrated Circuit (ASIC)) and a Complex Programmable Logic Device (CPLD) 518 that are coupled together, and that may provide a portion of the networking engine 304 and/or the communication system 308 discussed above with reference to FIG. 3. A register 520 (e.g., a serial-to-parallel shift register) is coupled to the CPLD 432 and to the port 500 in the port system 308a (e.g., via eight pins on the register 520 coupled to the port 500), and a register 521 (e.g., a serial-to-parallel shift register) is coupled to the CPLD 432 and the port 502 in the port system 308b (e.g., via eight pins on the register 521 coupled to the port 500). As will be recognized by one of skill in the art in possession of the present disclosure, the embodiment illustrated in FIG. 5B provides an example a multi-color LED system in which each register 520 and 521 includes two of its pins that are configured to couple to a respective LED(s) on a direct-attach cable connector to enable those LED(s) to illuminate green (via the assertion of the first pin), red (via the assertion of the second pin), and amber (via the assertion of both the first pin and the second pin). However, while a specific multi-color LED system is described, one of skill in the art in possession of the present disclosure will appreciate that other LED systems will fall within the scope of the present disclosure as well.

As discussed below, the networking processing system 516, the CPLD 518, and/or the register 520 may be configured to generate and transmit data transmission information that is associated with the transmission of data via the port 500 in the port system 308a, and provide that data transmission information via the port 500 to a direct-attach cable connector that is coupled to the port 500, discussed in further detail below. Similarly, the networking processing system 516, the CPLD 518, and/or the register 521 may be configured to generate and transmit data transmission information that is associated with the transmission of data via the port 502 in the port system 308b, and provide that data transmission information via the port 502 to a direct-attach cable connector that is coupled to the port 502, discussed in further detail below.

As will be appreciated by one of skill in the art in possession of the present disclosure, a respective register that is similar to the registers 520 or 521 may be provided for each port system on the networking device 300. As such, FIG. 5B illustrates a register 522 (e.g., a serial-to-parallel shift register) coupled to the CPLD 432 and the port 512 in the port system 310c (e.g., via eight pins on the register 522 coupled to the port 512), and a register 522 (e.g., a serial-to-parallel shift register) coupled to the CPLD 432 and the port 514 in the port system 310d (e.g., via eight pins on the register 522 coupled to the port 514). As discussed below, the networking processing system 516, the CPLD 518, and/or the register 522 may be configured to generate and transmit data transmission information that is associated with the transmission of data via the port 512 in the port system 310b, and provide that data transmission information via the port 512 to a direct-attach cable connector that is coupled to the port 512, discussed in further detail below. Similarly, the networking processing system 516, the CPLD 518, and/or the register 523 may be configured to generate and transmit data transmission information that is associated with the transmission of data via the port 514 in the port system 310d, and provide that data transmission information via the port 514 to a direct-attach cable connector that is coupled to the port 514, discussed in further detail below.

Figure 6:
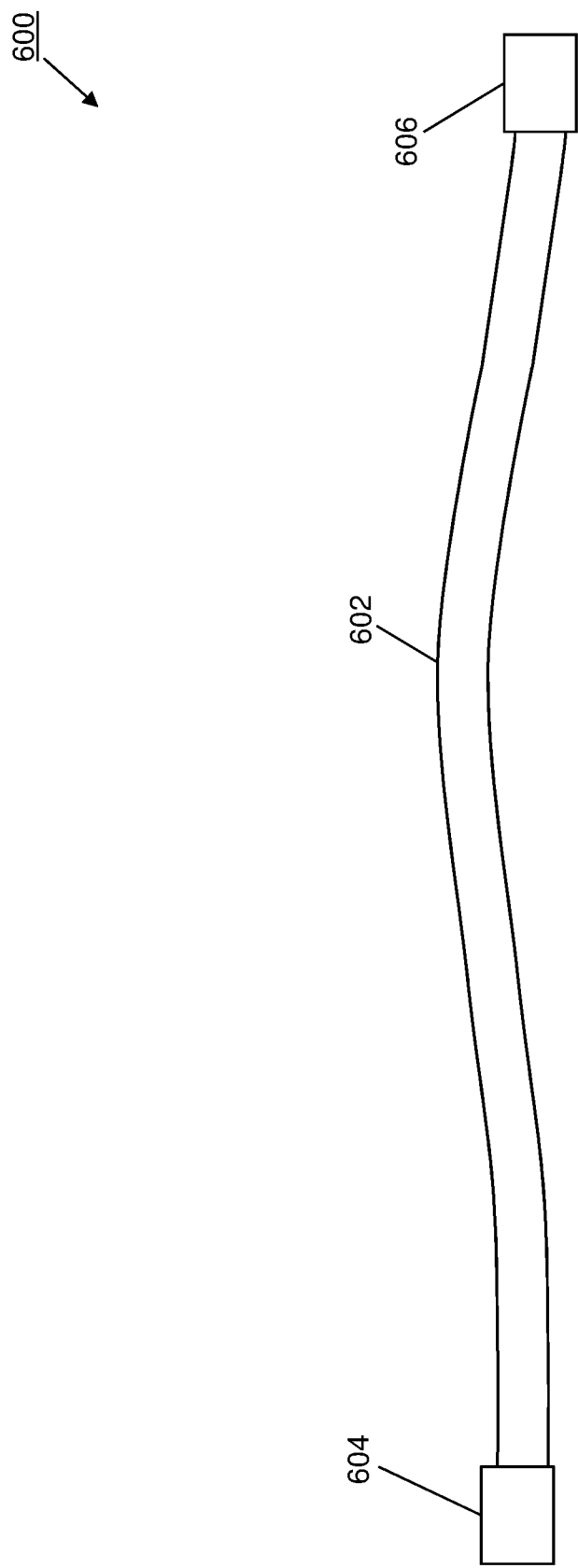
FIG. 6 is a schematic view illustrating an embodiment of a direct-attach cable that may be provided according to the teachings of the present disclosure.

Referring now to FIG. 6, an embodiment of a direct-attach cable 600 is illustrated that may provide the direct-attach cable 206 discussed above with reference to FIG. 2. As such, the direct-attach cable 600 may be provided by a passive DAC cable, an active DAC cable, an AOC, and/or any other direct-attach cable that would be apparent to one of skill in the art in possession of the present disclosure. In the illustrated embodiment, the direct-attach cable 600 includes direct-attach cabling 602 having a first direct-attach cable connector 604 located on a first end of the direct-attach cabling 602, and a second direct-attach cable connector 606 located on a second end of the direct-attach cabling 602 that is opposite the first end. As will be appreciated by one of skill in the art in possession of the present disclosure, the direct-attach cable 600 illustrated in FIG. 6 provides an example of a direct-attach cable that includes a single direct-attach cable connector 606 that may be utilized to couple the networking device 202 to a single connected device 204.

Figure 7:
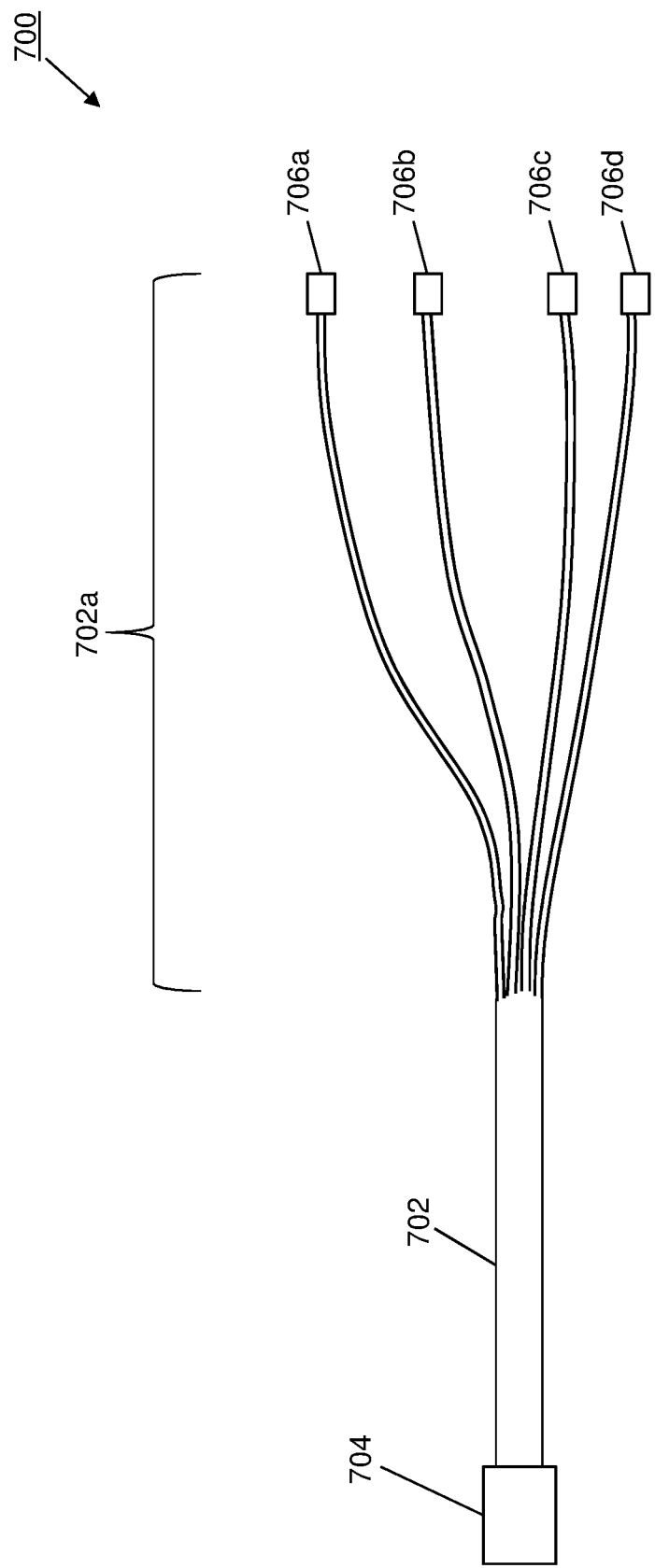
FIG. 7 is a schematic view illustrating an embodiment of a direct-attach cable that may be provided according to the teachings of the present disclosure.

Referring now to FIG. 7, an embodiment of a direct-attach cable 700 is illustrated that may provide the direct-attach cable 206 discussed above with reference to FIG. 2. As such, the direct-attach cable 700 may be provided by a passive DAC cable, an active DAC cable, an AOC, and/or any other direct-attach cable that would be apparent to one of skill in the art in possession of the present disclosure. In the illustrated embodiment, the direct-attach cable 700 includes direct-attach cabling 702 including a breakout section 702a, a first direct-attach cable connector 704 located on a first end of the direct-attach cabling 702, and a plurality of second direct-attach cable connectors 706a, 706b, 706c, and 706d located on respective second ends of the direct-attach cabling 702 that are opposite the first end and that are provided on respective breakout cabling included in the breakout section 702a of the direct-attach cabling 702. As will be appreciated by one of skill in the art in possession of the present disclosure, the direct-attach cable 700 illustrated in FIG. 7 provides an example of a direct-attach cable that may be a "breakout cable" that includes a plurality of direct-attach cable connectors that may be utilized to couple the networking device 202 to a plurality of connected devices 204 (e.g., four connected devices in the examples below). However, while two specific direct-attach cables are described herein, one of skill in the art in possession of the present disclosure will appreciate how other direct-attach cables may benefit from the teachings of the present disclosure and thus will fall within its scope as well.

Figure 8A:
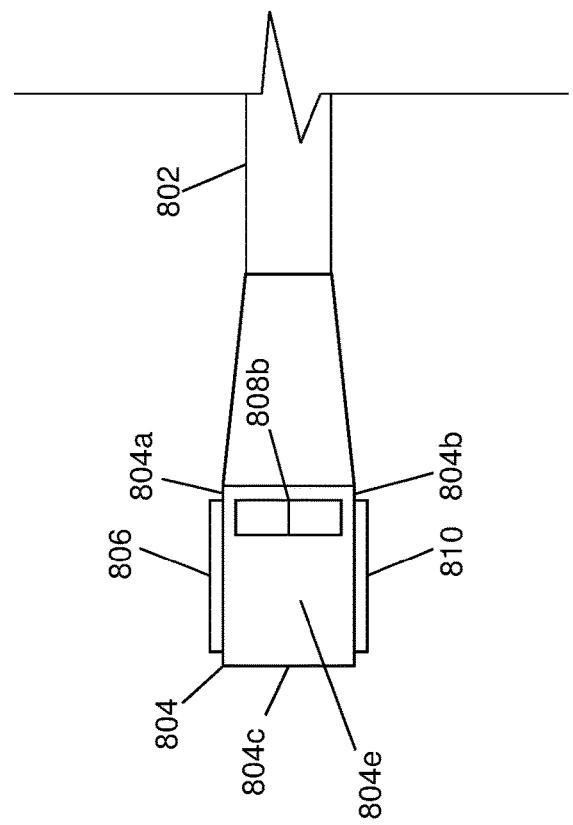
FIG. 8A is a schematic side view illustrating an embodiment of a direct-attach cable connector that may be provided on the direct-attach cable of FIG. 6 or 7.
Figure 8B:
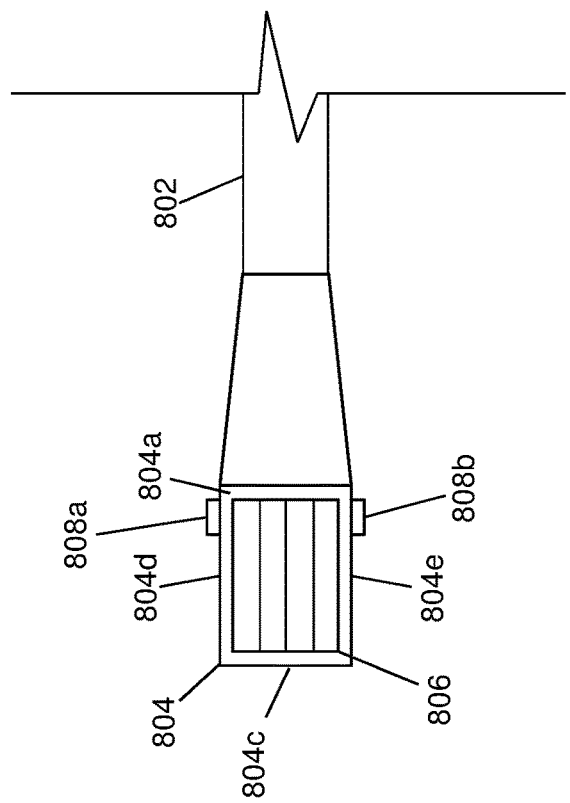
FIG. 8B is a schematic top view illustrating an embodiment of a direct-attach cable connector that may be provided on the direct-attach cable of FIG. 6 or 7.
Figure 8C:
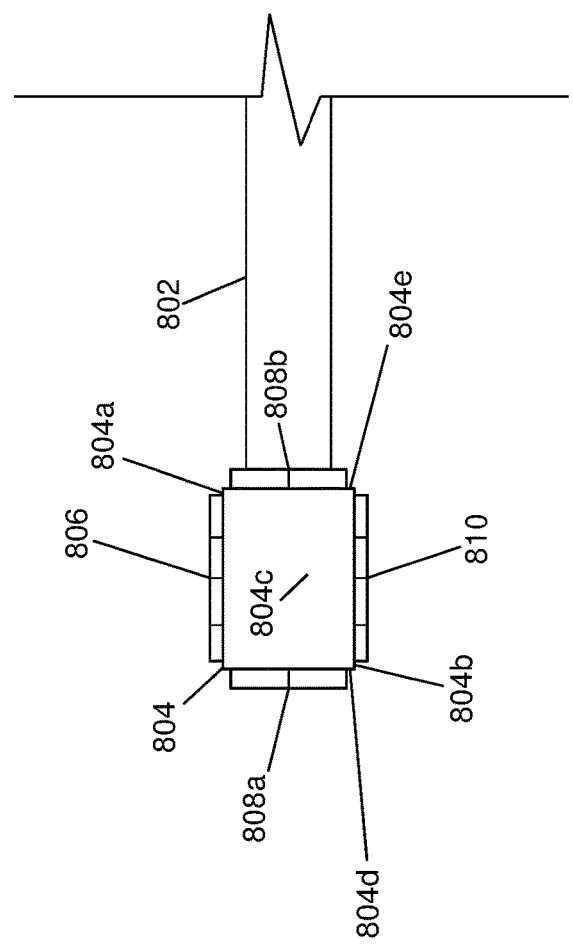
FIG. 8C is a schematic front view illustrating an embodiment of a direct-attach cable connector that may be provided on the direct-attach cable of FIG. 6 or 7.

With reference to FIGS. 8A, 8B, and 8C, an embodiment of a direct-attach cable connector system 800 is illustrated that is discussed as providing the direct-attach cable connectors 206a, 604, and/or 704 discussed above, but that one of skill in the art in possession of the present disclosure will appreciate may provide the direct-attach cable connectors 206b, 606, 706a, 706b, 706c, and/or 706c in some embodiments as well. In the illustrated embodiment, the direct-attach cable connector system 800 includes direct-attach cabling 802, and a direct-attach cable connector 804 that is located on an end of that direct-attach cabling 802. As illustrated, the direct-attach cable connector 804 includes a top surface 804a, a bottom surface 804b that is located opposite the direct-attach cable connector 804 from the top surface 804a, a front surface 804c that extends between the top surface 804a and the bottom surface 804b, and a pair of side surface 804d and 804e that are located opposite the direct-attach cable connector 804 from each other and that each extend between the top surface 804a, the bottom surface 804b, and the front surface 804c. While not illustrated or described in detail, one of skill in the art in possession of the present disclosure will recognize that the front surface 804c of the direct-attach cable connector 804 may include a variety of connector components that are configured to connect to the ports and/or other networking device coupling subsystems known in the art.

In some embodiments, the direct-attach cable connector system 800 may provide a plurality of visual indicator devices on the direct-attach cable connector 804. In the examples illustrated and described below, a visual indicator device 806 is included on the top surface 804a of the direct-attach cable connector 804, a virtual indicator device 808a/808b is included on the side surfaces 806d and 806e of the direct-attach cable connector 804, and a visual indicator device 810 is included on the bottom surface 804b of the direct-attach cable connector 804. In the specific examples provided herein, each of the visual indicator devices 806, 808a/808b, and 810 provide four LEDs (i.e., with the indicator device 806 providing four adjacent LEDs on the top surface 804a of the direct-attach cable connector 804, the indicator device 808a/808b providing two adjacent LEDs on the side surface 804d of the direct-attach cable connector 804 and two adjacent LEDs on the side surface 804e of the direct-attach cable connector 804, and the indicator device 810 providing four adjacent LEDs on the bottom surface 804c of the direct-attach cable connector 804. However, while each indicator device 806, 808a/808b, and 810 on the direct-attach cable connector 804 is illustrated and discussed as including four LEDs, one of skill in the art in possession of the present disclosure will appreciate that different types and numbers of visual indicators will fall within the scope of the present disclosure as well.

While not illustrated in detail, one of skill in the art in possession of the present disclosure will recognize that each of the visual indicator devices 806, 808a/808b, and 810 may include connections, couplings, wiring, traces, and/or other subsystems that one of skill in the art in possession of the present disclosure would recognize as coupling those visual indicator devices 806, 808a/808b, and 810 to the direct-attach cable connector 804 in a manner that allows them to receive the data transmission information transmitted by the networking device 202/300 via its ports as discussed below. Furthermore, while multiple virtual indicator devices are illustrated and described as being included on the direct-attach cable connector 804, one of skill in the art in possession of the present disclosure will appreciate that the direct-attach cable connector 804 may include only one of the visual indicator devices illustrated in FIGS. 8A-8C, only two the visual indicator devices illustrated in FIGS. 8A-8C, or more than the three visual indicator devices illustrated in FIGS. 8A-8C. For example, the inventors of the present disclosure have determined that many of the benefits of the direct-attach cable data transmission indicator system described herein may be realized utilizing only the visual indicator device 808a/808b illustrated in FIGS. 8A-8C, although embodiments that utilize only the visual indicator device 806 or 810, or embodiments that utilize the two of the three visual indicator devices illustrated in FIGS. 8A and 8B, will fall within the scope of the present disclosure as well. Thus, while a specific embodiment of a direct-attach cable connector system 800 is illustrated and described, a wide variety of different components and/or component configurations for the direct-attach cable connector system 800 are envisioned as falling within the scope of the present disclosure as well.

Figure 9:
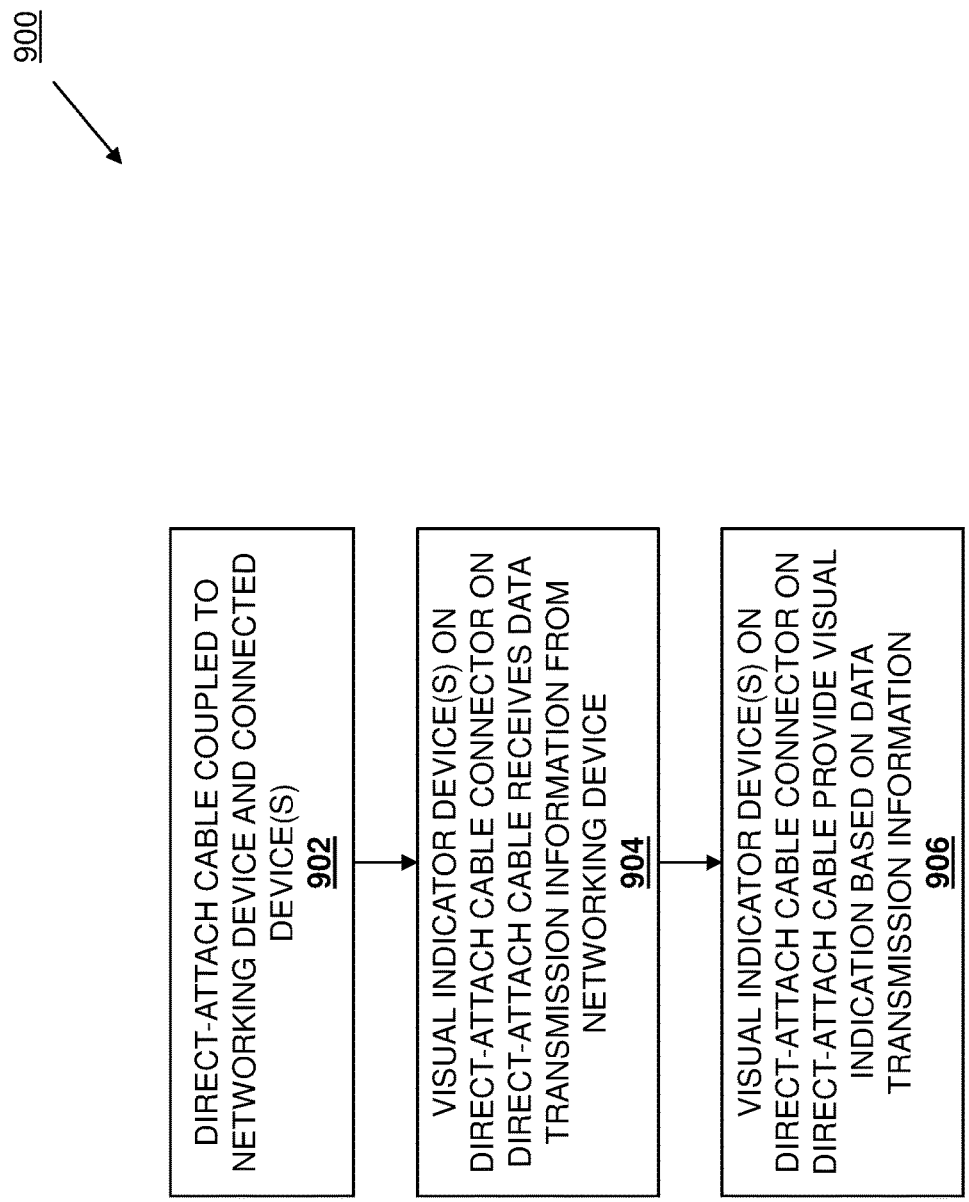
FIG. 9 is a flow chart illustrating an embodiment of a method for providing data transmission visual indications via a direct-attach cable.

Referring now to FIG. 9, an embodiment of a method 900 for providing data transmission visual indications via a direct-attach cable is illustrated. As discussed below, the systems and methods of the present disclosure provide a direct-attach cable connector on a direct-attach cable that includes one or more visual indicator devices that are visible when the direct-attach cable connector is coupled to a port, which allows the visual indicator device(s) to receive data transmission information via that port and provide corresponding visual indications of data transmission via that port. For example, the direct-attach cable data transmission visual indicator system includes a networking device having a port. A direct-attach cable includes a direct-attach cable connector that is located on an end of the direct-attach cable and that couples the direct-attach cable to the port. A visual indicator device is included on the direct-attach cable connector and is configured to receive data transmission information from the networking device via the port and the direct-attach cable connector, with the data transmission information associated with the transmission of data via the port. The visual indicator device then provides a visual indication that is based on the data transmission information. As such, in situations where the networking device does not provide visual indicator device(s) adjacent its port, or when the visual indicator device(s) adjacent ports on the networking device are obscured by direct-attach cable(s) or other visual obstructions, a user will still be able to view the visual indications provided by the visual indicator device(s) on the direct-attach cable connector.

Figure 10A:
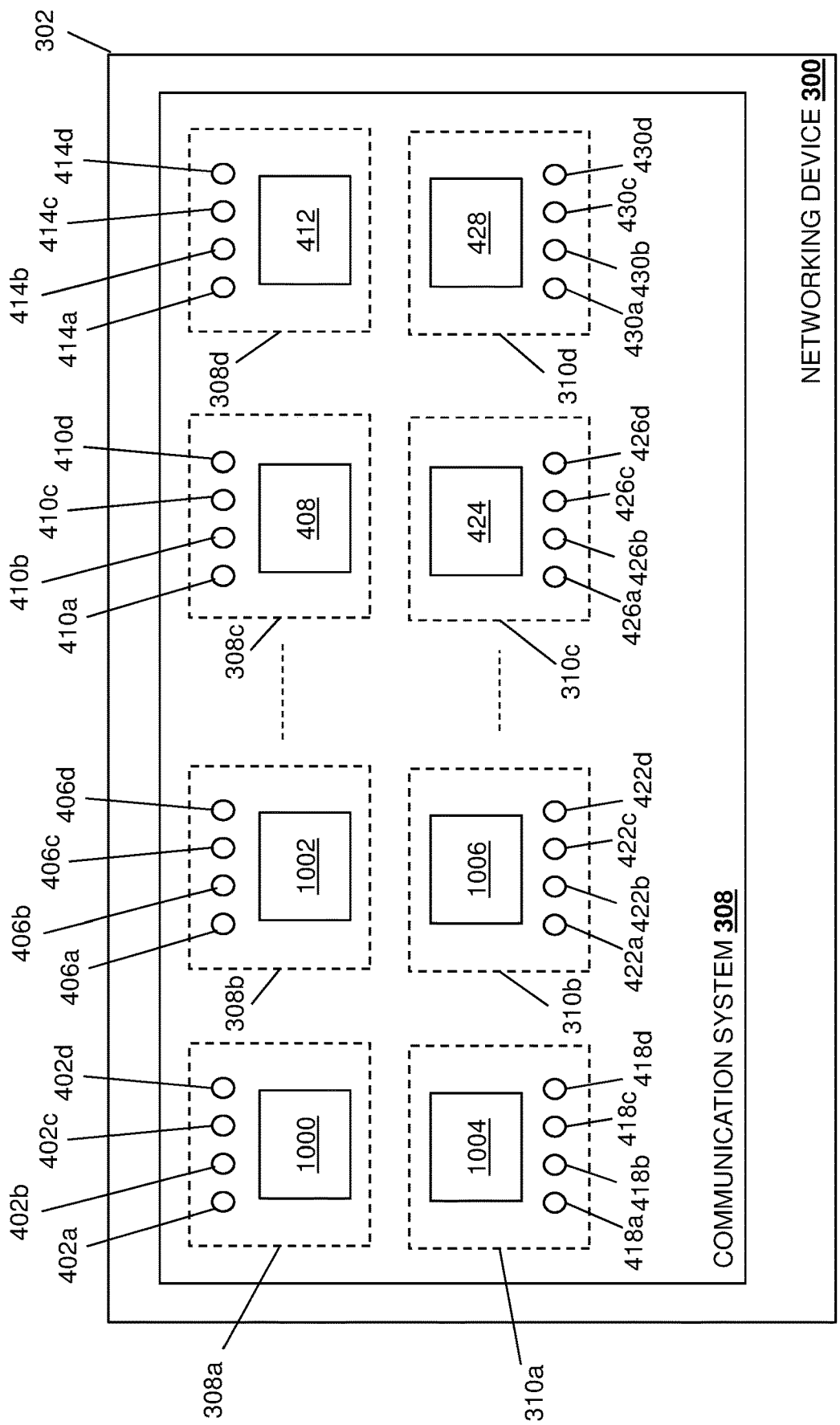
FIG. 10A is a schematic view illustrating an embodiment of the networking device of FIG. 4 during the method of FIG. 9.
Figure 10B:
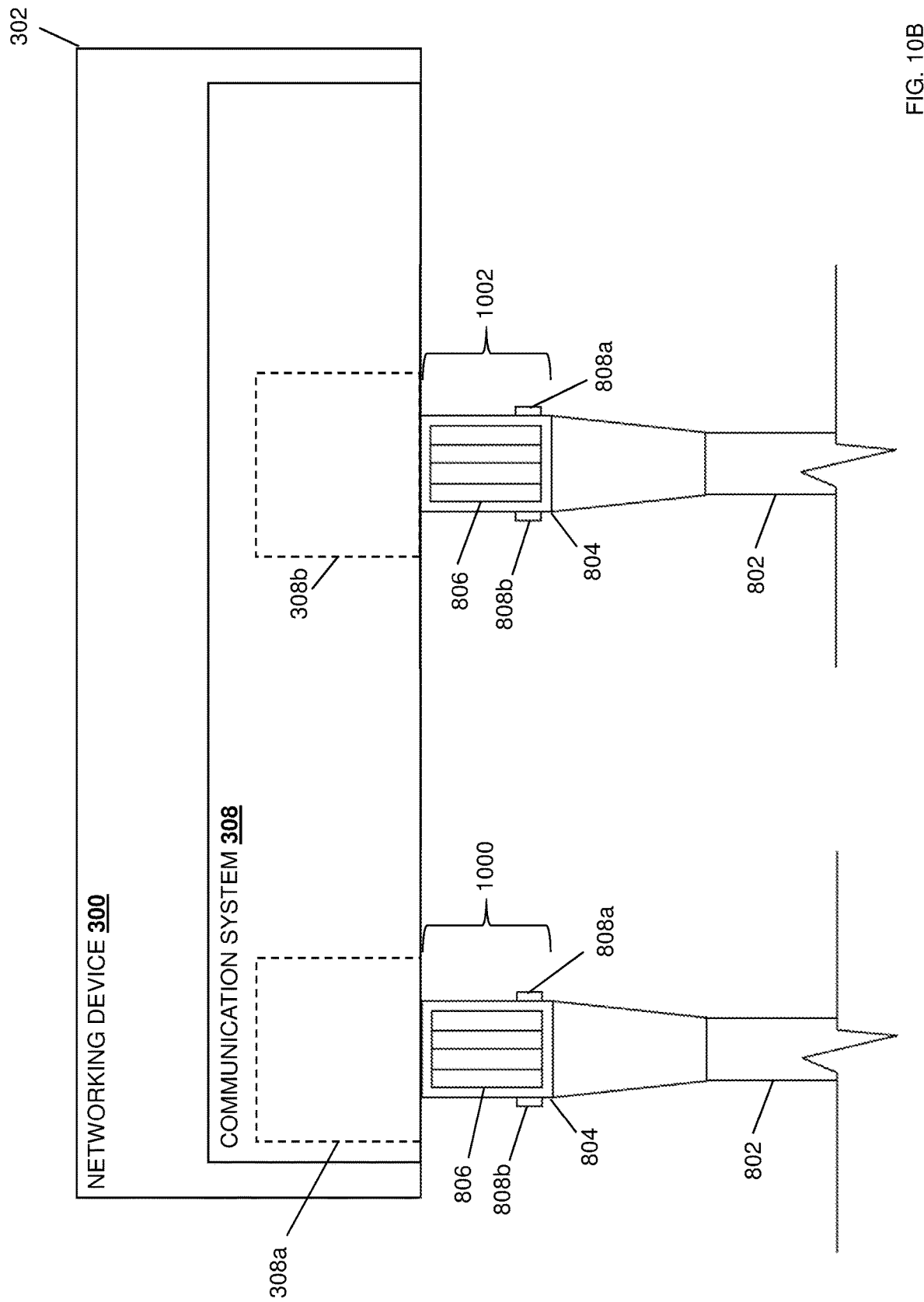
FIG. 10B is a schematic view illustrating an embodiment of the direct-attach cable connector of FIGS. 8A-8C coupled to the networking device of FIG. 10A during the method of FIG. 9.
Figure 10C:
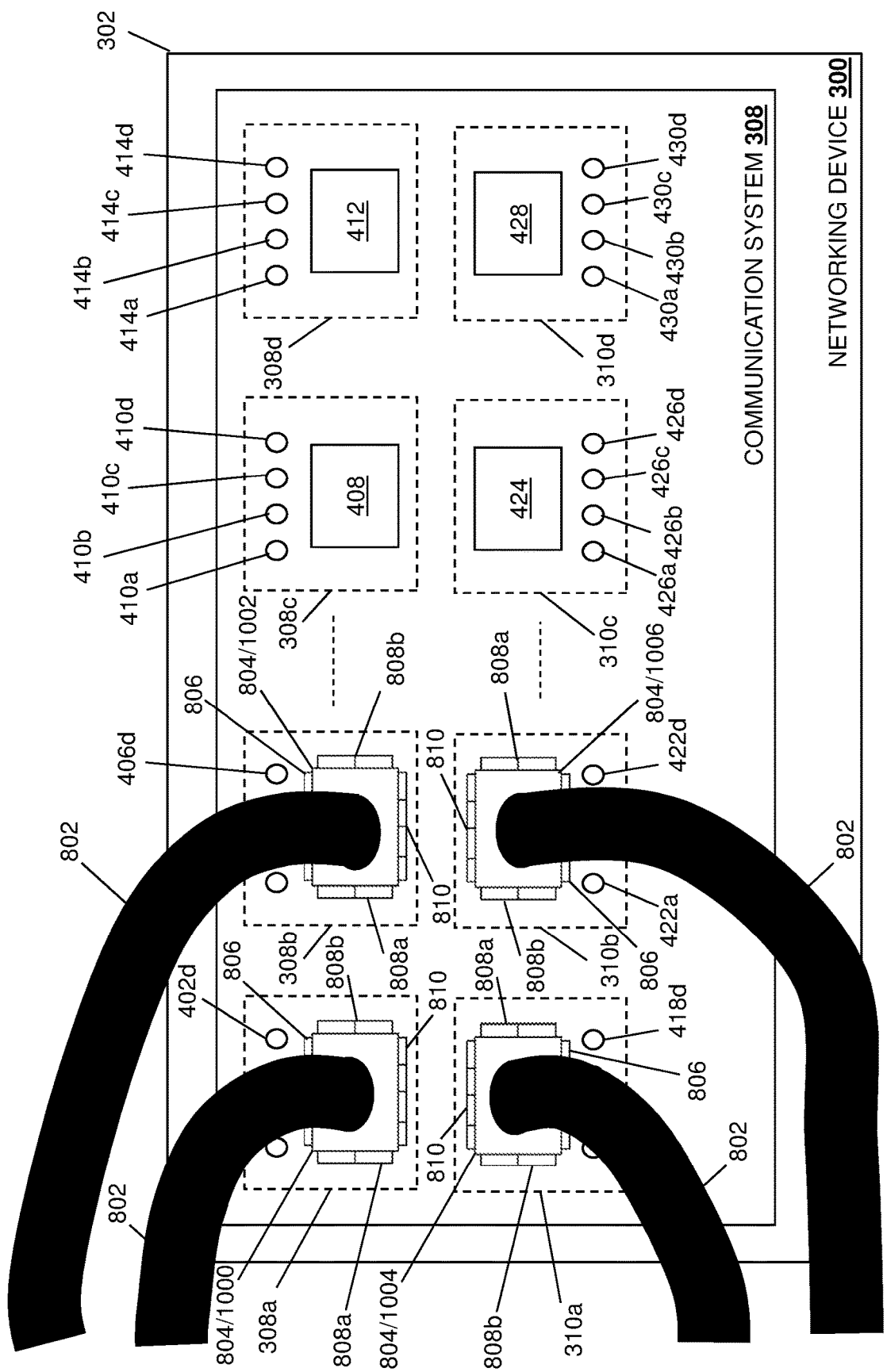
FIG. 10C is a schematic view illustrating an embodiment of the direct-attach cable connector of FIGS. 8A-8C coupled to the networking device of FIG. 10A during the method of FIG. 9.

The method 900 begins at block 902 where a direct-attach cable is coupled to a networking device and connected device(s). With reference to FIGS. 10A, 10B, and 10C, in an embodiment of block 902, a direct-attach cable connector 1000 on a first direct-attach cable may be connected to the port 400 in the port system 308a, a direct-attach cable connector 1002 on a second direct-attach cable may be connected to the port 404 in the port system 308b, a direct-attach cable connector 1004 on a third direct-attach cable may be connected to the port 416 in the port system 310a, and a direct-attach cable connector 1006 on a fourth direct-attach cable may be connected to the port 420 in the port system 310b. As such, FIGS. 10B and 10C illustrate the direct-attach cable connector 804/1000 included on the first direct-attach cable connected to the port 400 in the port system 308a, FIGS. 10B and 10C illustrate the direct-attach cable connector 804/1002 included on the second direct-attach cable connected to the port 404 in the port system 308b, FIG. 10C illustrates the direct-attach cable connector 804/1004 included on the third direct-attach cable connected to the port 416 on the port system 310a, and FIG. 10C illustrates the direct-attach cable connector 804/1006 included on the fourth direct-attach cable connected to the port 420 on the port system 310b.

As will be appreciated by one of skill in the art in possession of the present disclosure, FIG. 10C illustrates how the direct-attach cable connectors 804/1000/1002 included on the first and second direct-attach cables connect to the ports 400 and 404, respectively, on the ports systems 308a and 308b, respectively, in a first orientation, and how the direct-attach cable connectors 804/1004/1006 included on the third and fourth direct-attach cables connect to the ports 416 and 420, respectively, on the port systems 310a and 310b, respectively, in a second orientation that is inverted relative to the first orientation. However, while specific connection orientations are provided, one of skill in the art in possession of the present disclosure will appreciate that a variety of direct-attach cable connector orientations will fall within the scope of the present disclosure as well. Furthermore, FIG. 10C illustrates how the direct-attach cabling 802 on the first, second, third, and fourth direct-attach cables may be routed in a manner that obscures at least a portion of the visual indicator devices included in the port systems 308a, 308b, 310a, and 310b (e.g., the LEDs 402a-402d, 406a-406d, 418a-418d, and 422a-422d in the illustrated example), while the visual indicator devices 808a/808b and 810 on each of the direct-attach cable connectors 804 are visible. However, while a specific direct-attach cabling routing situation is illustrated, one of skill in the art in possession of the present disclosure will appreciate that direct-attach cabling may be routed in a variety of manners that may obscure at least a portion of the visual indicator devices included in the port systems 308a, 308b, 310a, and 310b while at least one of the visual indicator devices 806, 808a/808b, and 810 on each of the direct-attach cable connectors 804/1000/1002/1004/1006 is visible.

While not illustrated, one of skill in the art in possession of the present disclosure will recognize how the direct-attach cable connector 206b, 606, or 706a-706d on each direct-attach cable 206, 600, or 700, respectively, may then be connected to a connected device 204. For example, when the direct-attach cable 600 is utilized at block 902, the direct-attach cable connector 606 may be connected to a single connected device 204. However, in another example where the direct-attach cable 700 is utilized at block 902, one or more of the direct-attach cable connectors 706a-706d may be connected to respective connected devices 204. As will be appreciated by one of skill in the art in possession of the present disclosure, the coupling of the networking device 202 and the connected device(s) 204 may be followed by a variety of connection/link establishment operations that allow for the transmission of data between the networking device and the connected device(s) 204 via the direct-attach cables.

Figure 11A:
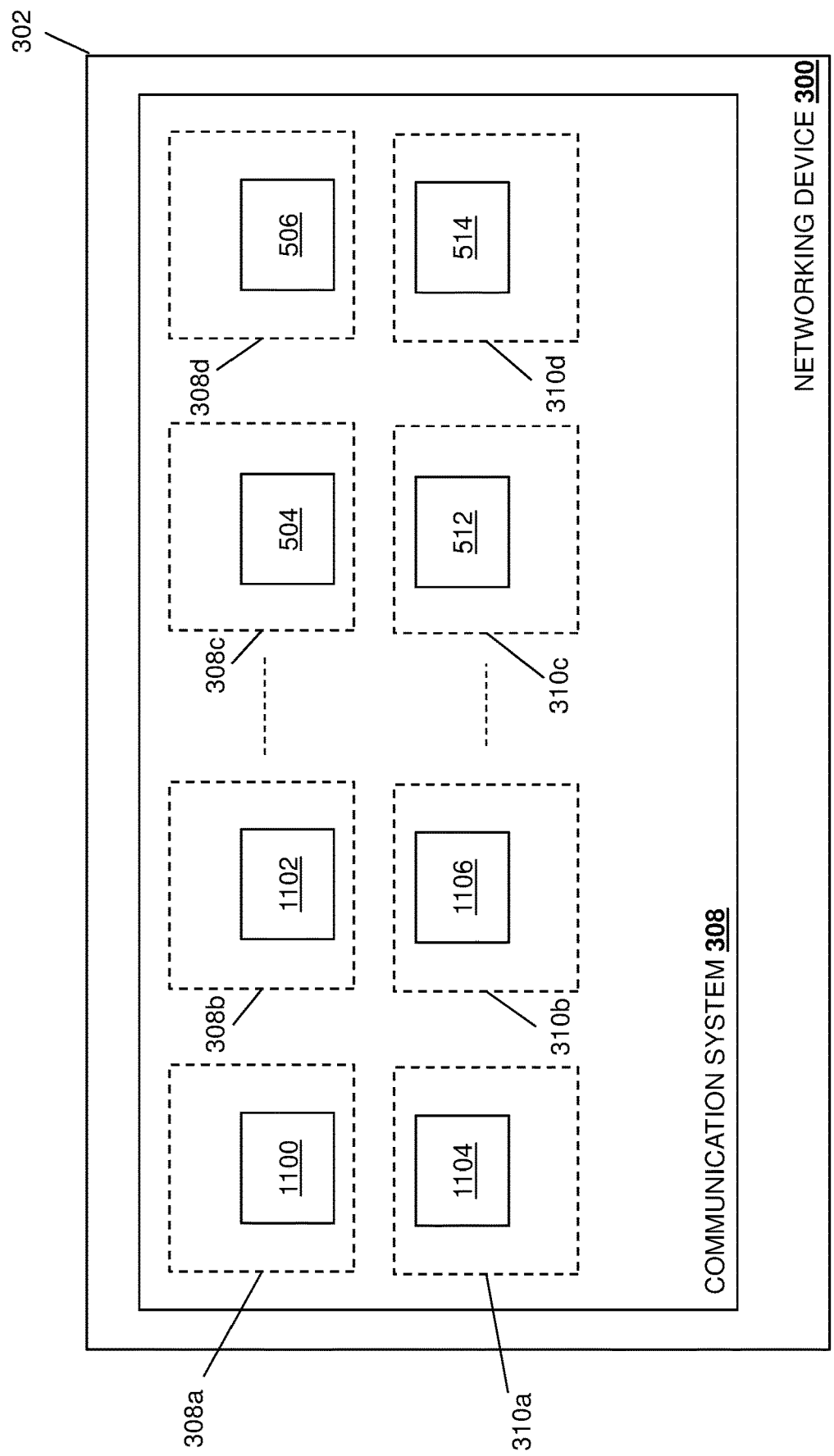
FIG. 11A is a schematic view illustrating an embodiment of the networking device of FIG. 5 during the method of FIG. 9.
Figure 11C:
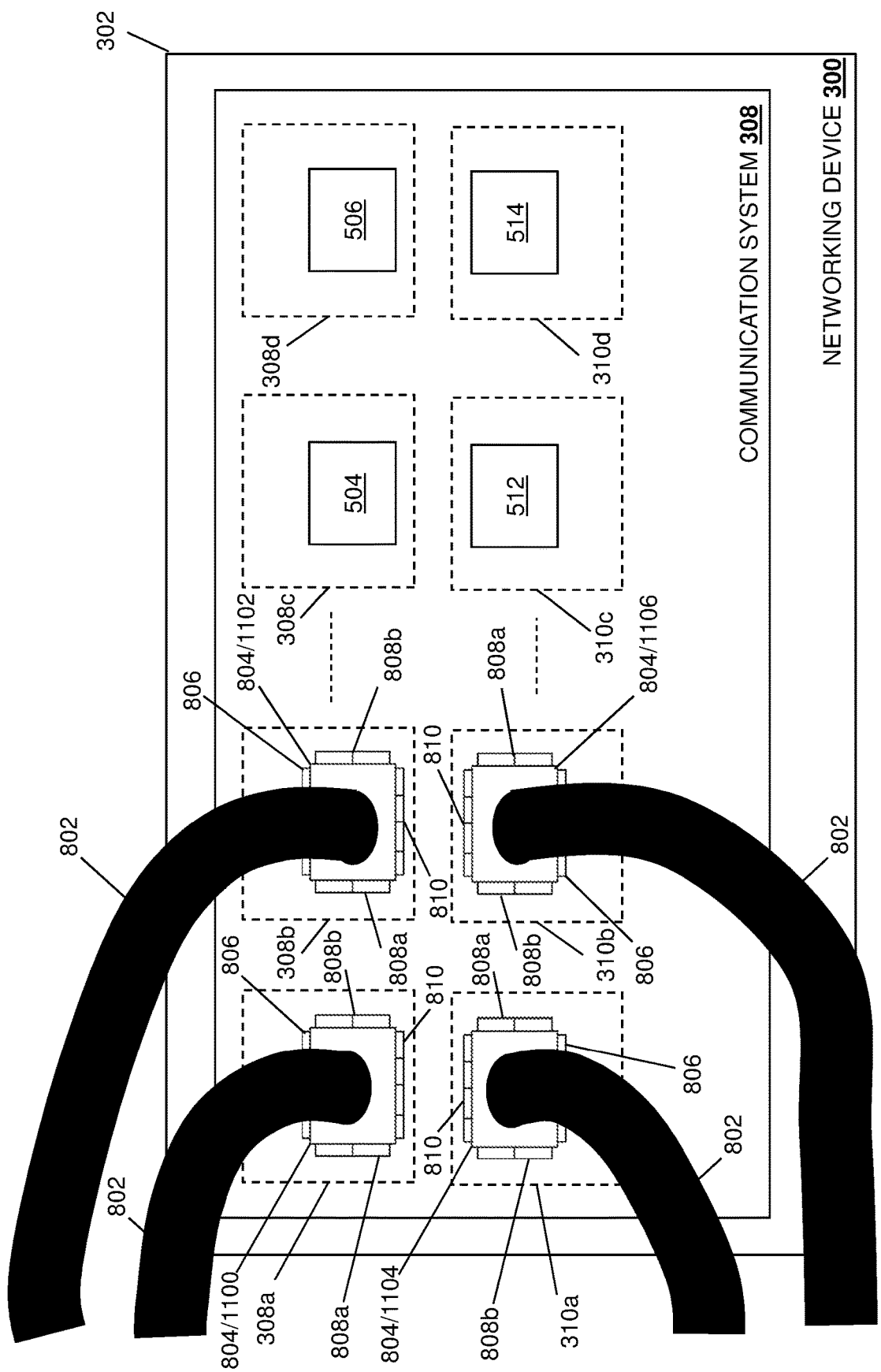
FIG. 11C is a schematic view illustrating an embodiment of the direct-attach cable connector of FIGS. 8A-8C coupled to the networking device of FIG. 11A during the method of FIG. 9.

With reference to FIGS. 11A, 11B, and 11C, in an embodiment of block 902, a direct-attach cable connector 1100 on a first direct-attach cable may be connected to the port 500 in the port system 308a, a direct-attach cable connector 1102 on a second direct-attach cable may be connected to the port 502 in the port system 308b, a direct-attach cable connector 1104 and a third direct-attach cable may be connected to the port 508 in the port system 310a, and a direct-attach cable connector 1106 on a fourth direct-attach cable may be connected to the port 510 in the port system 310b. As such, FIGS. 11B and 11C illustrate the direct-attach cable connector 804/1100 included on the first direct-attach cable connected to the port 500 on the port system 308a, FIGS. 11B and 11C illustrate the direct-attach cable connector 804/1102 included on the second direct-attach cable connected to the port 502 on the port system 308b, FIG. 11C illustrates the direct-attach cable connector 804/1104 included on the third direct-attach cable connected to the port 508 on the port system 310a, and FIG. 11D illustrates the direct-attach cable connector 804/1106 included on the fourth direct-attach cable connected to the port 510 on the port system 310b.

As will be appreciated by one of skill in the art in possession of the present disclosure, FIG. 11C illustrates how the direct-attach cable connectors 804/1100/1102 included on the first and second direct-attach cables connect to the ports 500 and 502, respectively, on the port systems 308*a* and 308*b*, respectively, in a first orientation, and how the direct-attach cable connectors 804/1104/1106 included on the third and fourth direct-attach cables connect to the ports 508 and 510, respectively, on the ports systems 310*a* and 310*b*, respectively, in a second orientation that is inverted relative to the first orientation. However, while specific connection orientations are provided, one of skill in the art in possession of the present disclosure will appreciate that a variety of direct-attach cable connector orientations will fall within the scope of the present disclosure as well. Furthermore, FIG. 11C illustrates how the direct-attach cabling 802 on the first, second, third, and fourth direct-attach cables may be routed in a manner that leaves the visual indicator devices 808*a*/808*b* and 810 on each of the direct-attach cable connectors 804 visible. However, while a specific direct-attach cabling routing situation is illustrated, one of skill in the art in possession of the present disclosure will appreciate that direct-attach cabling may be routed in a variety of manners that leave at least one of the visual indicator devices 806, 808*a*/808*b*, and 810 on each of the direct-attach cable connectors 804/1100/1102/1104/1106 visible.

While not illustrated, one of skill in the art in possession of the present disclosure will recognize how the direct-attach cable connector 206*b*, 606, or 706*a*-706*d* on each direct-attach cable 206, 600, or 700, respectively, may then be connected to a connected device 204. For example, when the direct-attach cable 600 is utilized at block 902, the direct-attach cable connector 606 may be connected to a single connected device 204. However, in another example where the direct-attach cable 700 is utilized at block 902, one or more of the direct-attach cable connectors 706*a*-706*d* may be connected to respective connected devices 204. As will be appreciated by one of skill in the art in possession of the present disclosure, the coupling of the networking device 202 and the connected device(s) 204 may be followed by a variety of connection/link establishment operations that allow for the transmission of data between the networking device and the connected device(s) 204 via the direct-attach cables.

The method 900 then proceeds to block 904 where visual indicator device(s) on a direct-attach cable connector on the direct-attach cable receives data transmission information from the networking device. In embodiments of block 904 like those illustrated in FIGS. 10A, 10B, and 10C, the establishment of the links between the networking device 202 and the connected device(s) 204 via the direct-attach cables will result in the networking engine 304 in the networking devices 202/300 generating and transmitting data transmission information. For example, with reference back to FIG. 4B, the networking processing system 430, the CPLD 432, and/or the register 434 may operate at block 904 to generate and transmit data transmission information associated with the data transmission via the port 400 to the visual indicator device in the port system 308*a*, which one of skill in the art in possession of the present disclosure will recognize is configured to cause one or more of the LEDs 402*a*-402*d* in the port system 308*a* to illuminate based on that data transmission information to provide a visual indication of that data transmission. In addition, the networking processing system 430, the CPLD 432, and/or the register 436 may operate at block 904 to generate and transmit that data transmission information associated with the data transmission via the port 400 through that port 400 to the connected direct-attach cable connector 804/1000 on the first direct-attach cable. As such, the visual indicator devices 806, 808*a*/808*b*, and 810 on the direct-attach cable connectors 804/1000 on the first direct-attach cable will receive that data transmission information via the port 400.

Similarly, the networking processing system 430, the CPLD 432, and/or the register 435 may operate at block 904 to generate and transmit data transmission information associated with the data transmission via the port 404 to the visual indicator device in the port system 308*b*, which one of skill in the art in possession of the present disclosure will recognize is configured to cause one or more of the LEDs 406*a*-406*d* in the port system 308*b* to illuminate based on that data transmission information to provide a visual indication of that data transmission. In addition, the networking processing system 430, the CPLD 432, and/or the register 437 may operate at block 904 to generate and transmit that data transmission information associated with the data transmission via the port 404 through that port 404 to the connected direct-attach cable connector 804/1002 on the second direct-attach cable. As such, the visual indicator devices 806, 808*a*/808*b*, and 810 on the direct-attach cable connectors 804/1002 on the second direct-attach cable will receive that data transmission information via the port 404.

While not described in detail, one of skill in the art in possession of the present disclosure will recognize how the networking processing system 430, the CPLD 432, and/or registers may operate at block 904 to generate and transmit data transmission information associated with the data transmission via the ports 416 and 420 to the visual indicator devices in the port systems 310*a* and 310*b* to cause one or more of the LEDs 418*a*-418*d* in the port system 310*a* and one or more of the LEDs 422*a*-422*d* in the port system 310*b* to illuminate based on that data transmission information to provide a visual indication of that data transmission, and the networking processing system 430, the CPLD 432, and/or registers may operate at block 904 to generate and transmit that data transmission information associated with the data transmission via the ports 416 and 420 through those ports 416 and 420 to their connected direct-attach cable connectors 804/1004/1006 on the third and fourth direct-attach cables. As such, the visual indicator devices 806, 808*a*/808*b*, and 810 on the direct-attach cable connector 804/1004 on the third direct-attach cable will receive that data transmission information via the port 416, and the visual indicator devices 806, 808*a*/808*b*, and 810 on the direct-attach cable connector 804/1006 on the fourth direct-attach cable will receive that data transmission information via the port 420.

Similarly, in embodiments of block 904 like those illustrated in FIGS. 11A, 11B, and 110, the establishment of the links between the networking device 202 and the connected device(s) 204 via the direct-attach cables will result in the networking engine 304 in the networking devices 202/300 generating and transmitting data transmission information. For example, with reference back to FIG. 5B, the networking processing system 430, the CPLD 432, and/or the register 520 may operate at block 904 to generate and transmit data transmission information associated with the data transmission via the port 500 through that port 500 to the connected direct-attach cable connector 804/1100 on the first direct-attach cable. As such, the visual indicator devices 806, 808*a*/808*b*, and 810 on the direct-attach cable connector 804/1100 on the first direct-attach cable will receive that data transmission information via the port 500. Similarly as well, the networking processing system 430, the CPLD 432, and/or the register 521 may operate at block 904 to generate and transmit data transmission information associated with the data transmission via the port 502 through that port 502 to the connected direct-attach cable connector 804/1102 on the second direct-attach cable. As such, the visual indicator devices 806, 808a/808b, and 810 on the direct-attach cable connector 804/1102 on the second direct-attach cable will receive that data transmission information via the port 502.

While not described in detail, one of skill in the art in possession of the present disclosure will recognize how the networking processing system 430, the CPLD 432, and/or registers may operate at block 904 to generate and transmit data transmission information associated with the data transmission via the ports 508 and 510 through those ports 508 and 510 to their connected direct-attach cable connectors 804/1104/1106 on the third and fourth direct-attach cables. As such, the visual indicator devices 806, 808a/808b, and 810 on the direct-attach cable connector 804/1104 on the third direct-attach cable will receive that data transmission information via the port 508, and the visual indicator devices 806, 808a/808b, and 810 on the direct-attach cable connector 804/1106 on the fourth direct-attach cable will receive that data transmission information via the port 510.

The method 900 then proceeds to block 906 where the visual indicator device(s) on the direct-attach cable connector on the direct-attach cable provide a visual indication based on the data transmission information. In an embodiment, at block 906, the visual indicator devices 806, 808a/808b, and 810 receiving the data transmission information at block 904 will operate to provide a visual indication based on that data transmission information. In the examples provided below, each of the visual indicator devices 806, 808a/808b, and 810 provides the same visual indications in order to provide for redundant visual indications, at least one of which should be visible in any direct-attach cabling routing situation. However, one of skill in the art in possession of the present disclosure will appreciate how different visual indicator devices may be configured to provide different visual indications while remaining within the scope of the present disclosure as well.

Figure 12A:
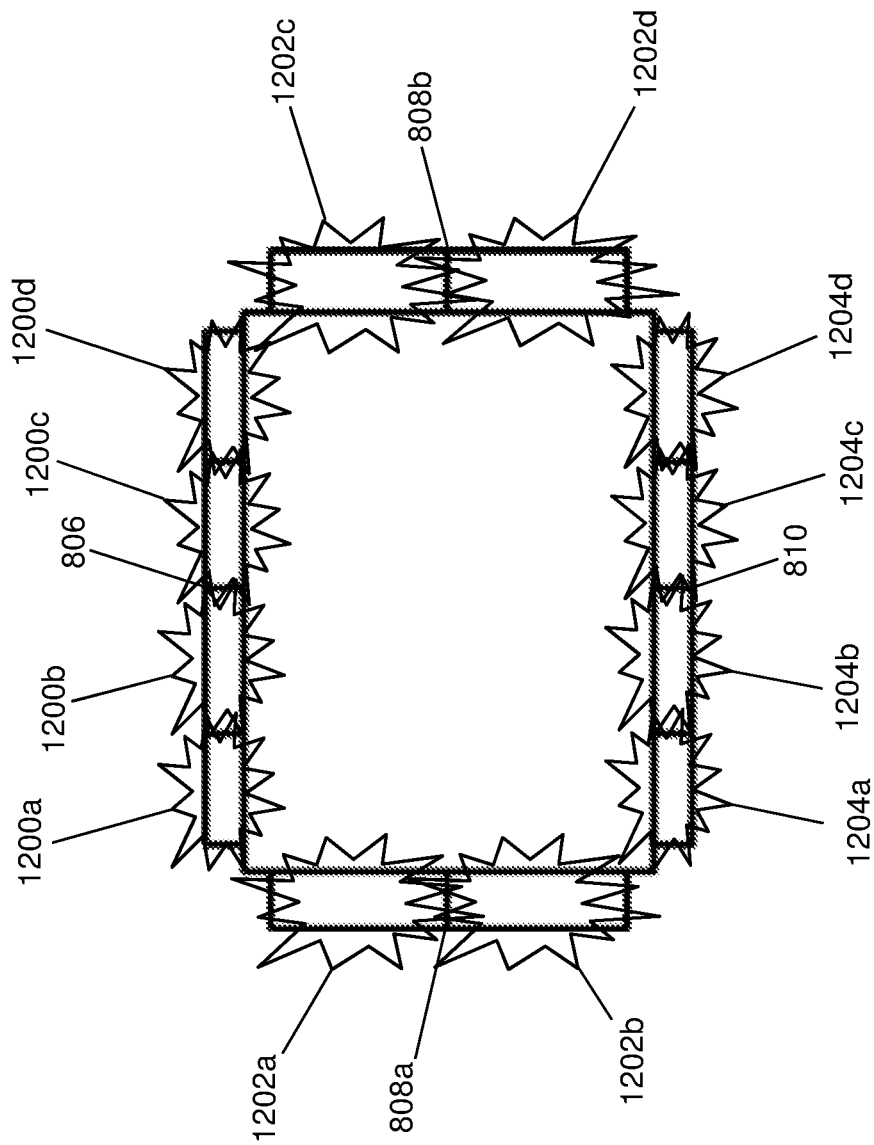
FIG. 12A is a schematic front view illustrating an embodiment of the direct-attach cable connector of FIGS. 8A-8C operating during the method of FIG. 9.

With reference to FIG. 12A, an embodiment of visual indications provided by the visual indicator devices 806, 808a/808b, and 810 on a direct-attach cable connector 804 is illustrated. In this example, the visual indicator device 806 is providing a visual indication that includes a first visual indication 1200a (e.g., provided by illuminating a first LED in the visual indicator device 806), a second visual indication 1200b (e.g., provided by illuminating a second LED in the visual indicator device 806), a third visual indication 1200c (e.g., provided by illuminating a third LED in the visual indicator device 806), and a fourth visual indication 1200d (e.g., provided by illuminating a fourth LED in the visual indicator device 806). Furthermore, the visual indicator device 808a/808b is providing a visual indication that includes a first visual indication 1202a (e.g., provided by illuminating a first LED in the visual indicator device 808a), a second visual indication 1202b (e.g., provided by illuminating a second LED in the visual indicator device 808a), a third visual indication 1202c (e.g., provided by illuminating a third LED in the visual indicator device 808b), and a fourth visual indication 1202d (e.g., provided by illuminating a fourth LED in the visual indicator device 808b). Further still, the visual indicator device 810 is providing a visual indication that includes a first visual indication 1204a (e.g., provided by illuminating a first LED in the visual indicator device 810), a second visual indication 1204b (e.g., provided by illuminating a second LED in the visual indicator device 810), a third visual indication 1204c (e.g., provided by illuminating a third LED in the visual indicator device 810), and a fourth visual indication 1204d (e.g., provided by illuminating a fourth LED in the visual indicator device 810).

As will be appreciated by one of skill in the art in possession of the present disclosure, any of the visual indications provided by the visual indicator devices 806, 808a/808b, and 810 may be provided in different colors (e.g., green, red, amber, blue, etc.) in order to indicate different data transmission information. For example, the visual indications 1200a-1200d provided by the visual indicator device 806, the visual indications 1202a-1202d provided by the visual indicator device 808a/808b, and the visual indications 1204a-1204d provided by the visual indicator device 810, may each provide an indication that the connected port is operating at its maximum speed (e.g., 100 GbE) when those indications are green, may provide an indication that the connected port has negotiated to operate at a speed that is lower than its maximum speed when those indications are amber, and may provide an indication that the connected port is not operating when those indications are red. As such, only one of the visual indicator devices 806, 808a/808b, and 810 need be visible to a user to visually indicate data transmission information to a user. However, while a few examples have been provided, one of skill in the art in possession of the present disclosure will appreciate that visual indications may be defined and provided in any manner while remaining within the scope of the present disclosure as well.

Figure 12B:
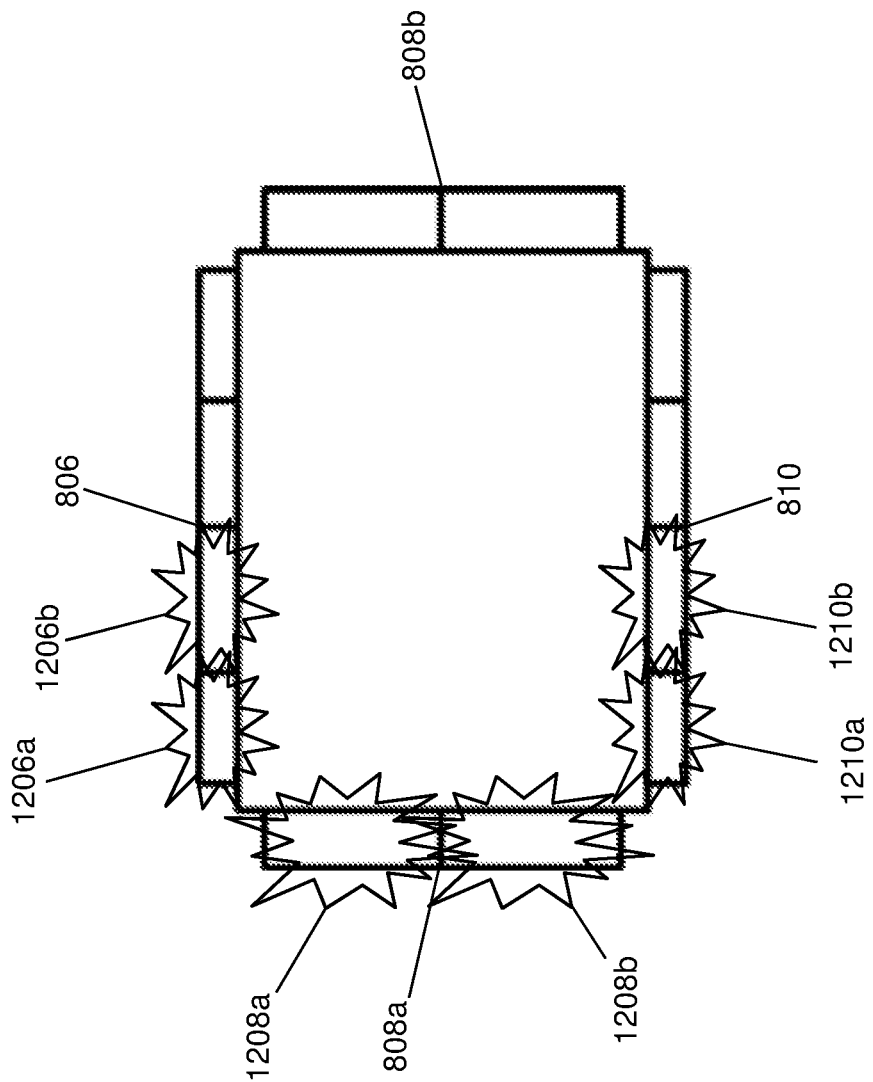
FIG. 12B is a schematic front view illustrating an embodiment of the direct-attach cable connector of FIGS. 8A-8C operating during the method of FIG. 9.

With reference to FIG. 12B, another embodiment of visual indications provided by the visual indicator devices 806, 808a/808b, and 810 on a direct-attach cable connector 804 is illustrated. In this example, the visual indicator device 806 is providing a visual indication that includes a first visual indication 1206a (e.g., provided by illuminating a first LED in the visual indicator device 806), and a second visual indication 1206b (e.g., provided by illuminating a second LED in the visual indicator device 806). Furthermore, the visual indicator device 808a/808b is providing a visual indication that includes a first visual indication 1208a (e.g., provided by illuminating a first LED in the visual indicator device 808a), and a second visual indication 1208b (e.g., provided by illuminating a second LED in the visual indicator device 808a). Further still, the visual indicator device 810 is providing a visual indication that includes a first visual indication 1210a (e.g., provided by illuminating a first LED in the visual indicator device 810), and a second visual indication 1210b (e.g., provided by illuminating a second LED in the visual indicator device 810).

In a specific example, the visual indications 1206a and 1206b provided by the visual indicator device 806, the visual indications 1208a and 1208b provided by the visual indicator device 808a/808b, and the visual indications 1210a and 1210b provided by the visual indicator device 810, may each provide an indication that the connected port is transmitting data via two data transmission lanes/logical ports (e.g., to connected devices 206 connected to the direct-attach cable connectors 706a and 706b on the direct-attach cable 700)) and not transmitting data via two data transmission lanes/logical ports. One of skill in the art in possession of the present disclosure will appreciate how this example illustrates how the direct-attach cable data transmission visual indicator system of the present disclosure supports "breakout" cable embodiments where a single physical port on the networking device provides four logical interfaces (e.g., at speeds of 4×10 GbE, 4×25 GbE, etc.). As such, only one of the visual indicator devices 806, 808a/808b, and 810 need be visible to a user to visually indicate data transmission information to a user. However, while a few examples have been provided, one of skill in the art in possession of the present disclosure will appreciate that visual indications may be defined and provided in any manner while remaining within the scope of the present disclosure as well.

Figure 12C:
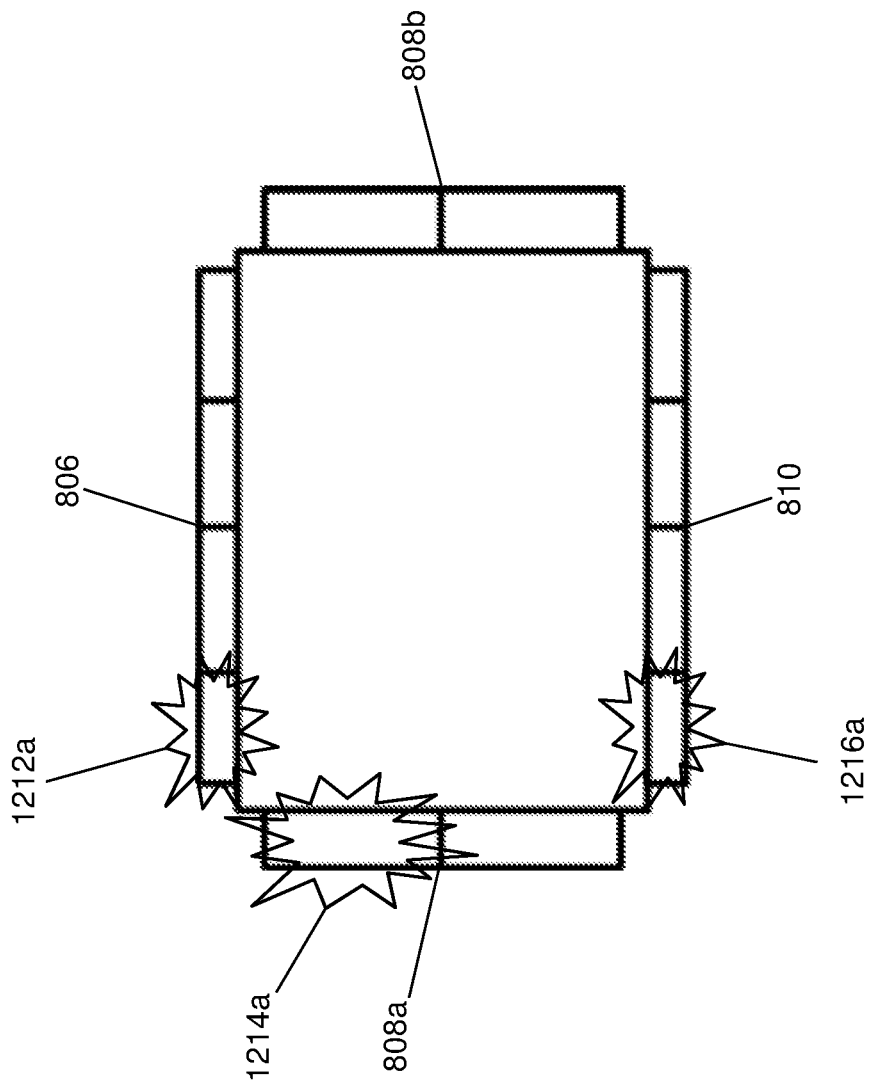
FIG. 12C is a schematic front view illustrating an embodiment of the direct-attach cable connector of FIGS. 8A-8C operating during the method of FIG. 9.

With reference to FIG. 12C, another embodiment of visual indications provided by the visual indicator devices 806, 808a/808b, and 810 on a direct-attach cable connector 804 is illustrated. In this example, the visual indicator device 806 is providing a visual indication that includes a first visual indication 1212a (e.g., provided by illuminating a first LED in the visual indicator device 806). Furthermore, the visual indicator device 808a/808b is providing a visual indication that includes a first visual indication 1214a (e.g., provided by illuminating a first LED in the visual indicator device 808a). Further still, the visual indicator device 810 is providing a visual indication that includes a first visual indication 1216a (e.g., provided by illuminating a first LED in the visual indicator device 810).

In a specific example, the visual indication 1212a provided by the visual indicator device 806, the visual indication 1214a provided by the visual indicator device 808a/808b, and the visual indication 1216a provided by the visual indicator device 810, may each provide an indication that the connected port is transmitting data via a single data transmission lane/logical port (e.g., to a connected device 204 connected to the direct-attach cable connector 706a on the direct-attach cable 700)) and not transmitting data via three data transmission lanes/logical ports. One of skill in the art in possession of the present disclosure will appreciate how this example illustrates how the direct-attach cable data transmission visual indicator system of the present disclosure supports "breakout" cable embodiments where a single physical port on the networking device provides four logical interfaces (e.g., at speeds of 4×10 GbE, 4×25 GbE, etc.). As such, only one of the visual indicator devices 806, 808a/808b, and 810 need be visible to a user to visually indicate data transmission information to a user. However, while a few examples have been provided, one of skill in the art in possession of the present disclosure will appreciate that visual indications may be defined and provided in any manner while remaining within the scope of the present disclosure as well.

Figure 12D:
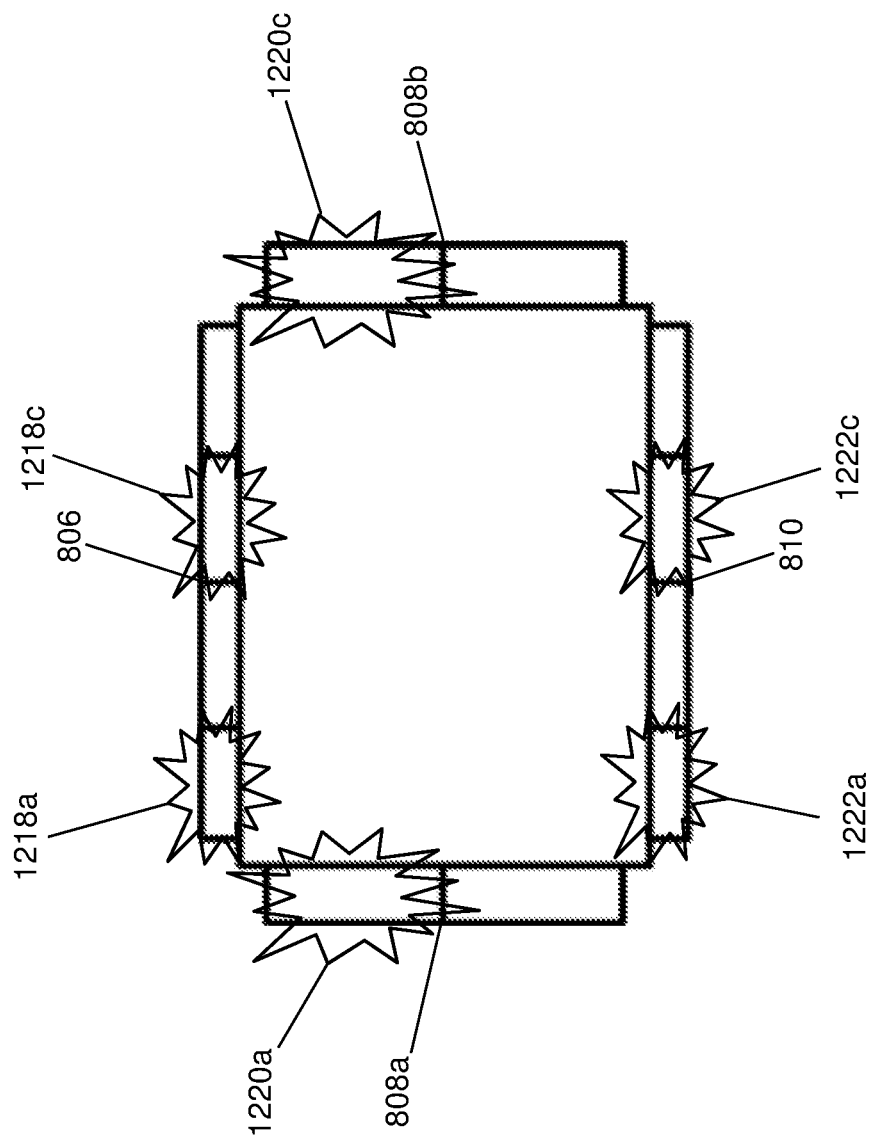
FIG. 12D is a schematic front view illustrating an embodiment of the direct-attach cable connector of FIGS. 8A-8C operating during the method of FIG. 9.

With reference to FIG. 12D, another embodiment of visual indications provided by the visual indicator devices 806, 808a/808b, and 810 on a direct-attach cable connector 804 is illustrated. In this example, the visual indicator device 806 is providing a visual indication that includes a first visual indication 1218a (e.g., provided by illuminating a first LED in the visual indicator device 806), and a third visual indication 1218c (e.g., provided by illuminating a third LED in the visual indicator device 806). Furthermore, the visual indicator device 808a/808b is providing a visual indication that includes a first visual indication 1220a (e.g., provided by illuminating a first LED in the visual indicator device 808a), and a third visual indication 1220c (e.g., provided by illuminating a third LED in the visual indicator device 808b). Further still, the visual indicator device 810 is providing a visual indication that includes a first visual indication 1222a (e.g., provided by illuminating a first LED in the visual indicator device 810), and a third visual indication 1222c (e.g., provided by illuminating a third LED in the visual indicator device 810).

In a specific example, the visual indications 1218a and 1218c provided by the visual indicator device 806, the visual indications 1220a and 1220c provided by the visual indicator device 808a/808b, and the visual indications 1222a and 1222c provided by the visual indicator device 810, may each provide an indication that the connected port is transmitting data via two data transmission lanes/logical ports (e.g., to connected devices 204 connected to the direct-attach cable connectors 706a and 706c on the direct-attach cable 700)) and not transmitting data via two data transmission lanes/logical ports. One of skill in the art in possession of the present disclosure will appreciate how this example illustrates how the direct-attach cable data transmission visual indicator system of the present disclosure supports "breakout" cable embodiments where a single physical port on the networking device provides four logical interfaces (e.g., at speeds of 4×10 GbE, 4×25 GbE, etc.). As such, only one of the visual indicator devices 806, 808a/808b, and 810 need be visible to a user to visually indicate data transmission information to a user. However, while a few examples have been provided, one of skill in the art in possession of the present disclosure will appreciate that visual indications may be defined and provided in any manner while remaining within the scope of the present disclosure as well.

The inventors of the present disclosure have developed a transceiver device data transmission visual indicator system that is described in U.S. patent application Ser. No. 17/147,269, filed on Jan. 12, 2021, the disclosure of which is incorporated by reference herein in its entirety. That transceiver device data transmission visual indicator system provides a transceiver device with visual indicator devices that are configured to provide visual indications based on data transmission information received via the port to which that transceiver device is connected, and one of skill in the art in possession of the present disclosure will recognize how the direct-attach cable data transmission visual indicator system of the present disclosure may be coordinated with that transceiver device data transmission visual indicator system in order to provide any of a variety of visual indication while remaining within the scope of the present disclosure as well.

Thus, systems and methods have been described that provide a DAC cable connector on a DAC cable that includes one or more LEDs that are visible when the DAC cable connector is coupled to a switch port via a transceiver device, which allows the LED(s) to receive data transmission information via that switch port and provide corresponding visual indications of data transmission via that switch port. For example, the DAC cable data transmission LED system includes a switch device having a switch port. A DAC cable includes a DAC cable connector that is located on an end of the DAC cable and that couples the DAC cable to the switch port. A plurality of LEDs are included on the DAC cable connector and are configured to receive data transmission information from the switch device via the switch port and the DAC cable connector, with the data transmission information associated with the transmission of data via the switch port. The LEDs then illuminate based on the data transmission information. As such, in situations where the switch device does not provide LED(s) adjacent its switch port, or when the LED(s) adjacent switch ports on the switch device are obscured by DAC cable(s), a user will still be able to view the visual indications provided by the LEDs(s) on the DAC cable connector.

Although illustrative embodiments have been shown and described, a wide range of modification, change and substitution is contemplated in the foregoing disclosure and in some instances, some features of the embodiments may be employed without a corresponding use of other features.

Accordingly, it is appropriate that the appended claims be construed broadly and in a manner consistent with the scope of the embodiments disclosed herein.

What is claimed is:

1. A direct-attach cable data transmission visual indicator system, comprising:
 a networking device;
 a port that is included on the networking device; and
 a direct-attach cable that includes:
  a direct-attach cable connector that is located on an end of the direct-attach cable and that couples the direct-attach cable to the port;
  at least two visual indicator devices that each include a plurality of Light Emitting Devices (LEDs) that are each included on a different side of the direct-attach cable connector, wherein each of the at least two visual indicator devices is configured to:
   receive, from the networking device via the port and the direct-attach cable connector, data transmission information that was generated by the networking device and that is configured to indicate an availability of the port when data is not being transmitted via the port; and
   provide, using the plurality of LEDs included on that visual indicator device, a visual indication that is based on the data transmission information and that indicates the availability of the port when data is not being transmitted via the port.

2. The system of claim 1, wherein the direct-attach cable includes a breakout portion that couples the networking device to a plurality of connected devices.

3. The system of claim 1, wherein the visual indication is configured to indicate that the port has negotiated to operate at a speed that is lower than its maximum speed.

4. The system of claim 3, wherein the visual indication includes an amber-colored light.

5. The system of claim 1, wherein the at least two visual indicator devices are included on opposing sides of the direct-attach cable connector.

6. The system of claim 1, wherein the at least two visual indicator devices are included on adjacent sides of the direct-attach cable connector.

7. The system of claim 1, wherein the networking device includes four visual indicator devices that are each located on nrespective sides of the direct-attach cable connector.

8. A direct-attach cable, comprising:
 a direct-attach cable connector that is located on an end of the direct-attach cable and that is configured to couple the direct-attach cable to a port on a networking device; and
 at least two visual indicator devices that each include a plurality of Light Emitting Devices (LEDs) that are each included on a different side of the direct-attach cable connector, wherein each of the at least two visual indicator devices is configured to:
  receive, from the networking device via the port and the direct-attach cable connector, data transmission information that was generated by the networking device and that is configured to indicate a n availability of the port when data is not being transmitted via the port; and
  provide, using the plurality of LEDs included on that visual indicator device, a visual indication that is based on the data transmission information and that indicates the availability of the port when data is not being transmitted via the port.

9. The direct-attach cable of claim 8, wherein the direct-attach cable includes a breakout portion that couples the networking device to a plurality of connected devices.

10. The direct-attach cable of claim 8, wherein the visual indication is configured to indicate that the port has negotiated to operate at a speed that is lower than its maximum speed.

11. The direct-attach cable of claim 10, wherein the visual indication includes an amber-colored light.

12. The direct-attach cable of claim 8, wherein the at least two visual indicator devices are included on opposing sides of the direct-attach cable connector.

13. The direct-attach cable of claim 8, wherein the at least two visual indicator devices are included on adjacent sides of the direct-attach cable connector.

14. A method for providing data transmission visual indications via a direct-attach cable, comprising:
 coupling, by a direct-attach cable connector that is located on an end of a direct-attach cable, to a port on a networking device;
 receiving, from the networking device via the port and the direct-attach cable connector by at least two visual indicator devices that each include a plurality of Light Emitting Devices (LEDs) that are each included on a different side of the direct-attach cable connector, data transmission information that was generated by the networking device and that is configured to indicate an availability of the port when data is not being transmitted via the port; and
 providing, by each of the at least two visual indicator devices using the plurality of LEDs included on that visual indicator device, a visual indication that is based on the data transmission information and that indicates the availability of the port when data is not being transmitted via the port.

15. The method of claim 14, wherein the direct-attach cable includes a breakout portion that couples the networking device to a plurality of connected devices.

16. The method of claim 14, wherein the visual indication is configured to indicate that the port has negotiated to operate at a speed that is lower than its maximum speed.

17. The method of claim 16, wherein the visual indication includes an amber-colored light.

18. The method of claim 14, wherein the at least two visual indicator devices are included on opposing sides of the direct-attach cable connector.

19. The method of claim 14, wherein the at least two visual indicator devices are included on adjacent sides of the direct-attach cable connector.

20. The method of claim 14, wherein the networking device includes four visual indicator devices that are each located on respective sides of the direct-attach cable connector.

* * * * *

UNITED STATES PATENT AND TRADEMARK OFFICE
CERTIFICATE OF CORRECTION

PATENT NO. : 11,822,451 B2
APPLICATION NO. : 17/218525
DATED : November 21, 2023
INVENTOR(S) : Rathinasamy et al.

It is certified that error appears in the above-identified patent and that said Letters Patent is hereby corrected as shown below:

In the Specification

Column 3, Line 14, "FIG. 100" should read -- FIG. 10C --;

Column 13, Line 40, "FIGS. 10A, 10B, and 100," should read -- FIGS. 10A, 10B, and 10C, --;

Column 13, Line 56, "FIG. 100" should read -- FIG. 10C --;

Column 13, Line 58, "FIG. 100" should read -- FIG. 10C --;

Column 13, Line 63, "FIG. 100" should read -- FIG. 10C --;

Column 14, Line 10, "FIG. 100" should read -- FIG. 10C --;

Column 16, Line 52, "FIGS. 11A, 11B, and 110," should read -- FIGS. 11A, 11B, and 11C, --.

Signed and Sealed this
Thirtieth Day of January, 2024

Katherine Kelly Vidal
*Director of the United States Patent and Trademark Office*